United States Patent [19]

Maeda et al.

[11] Patent Number: 4,756,987
[45] Date of Patent: Jul. 12, 1988

[54] OPTICAL RECORDING MEDIUM

[75] Inventors: Shuichi Maeda, Saitama; Yutaka Kurose, Kawasaki; Tetsuo Ozawa, Hatano, all of Japan

[73] Assignee: Mitsubishi Chemical Industries Limited, Tokyo, Japan

[21] Appl. No.: 934,694

[22] Filed: Nov. 25, 1986

[30] Foreign Application Priority Data

Nov. 27, 1985 [JP] Japan ................. 60-265017
Dec. 5, 1985 [JP] Japan ................. 60-274234
Mar. 19, 1986 [JP] Japan ................. 61-59285

[51] Int. Cl.$^4$ .................. G03C 1/72; G03C 5/16; G11B 7/24
[52] U.S. Cl. .................. 430/270; 430/495; 430/945; 346/135.1; 548/438
[58] Field of Search .......... 430/945, 270, 495; 346/135.1

[56] References Cited

U.S. PATENT DOCUMENTS 4,581,317 4/1986 Simmons, III .................. 430/270
4,585,722 4/1986 Morinaka et al. ................ 430/201

OTHER PUBLICATIONS

Hackh's Chemical Dictionary 4th ed., p. 377.

Primary Examiner—Paul R. Michl
Assistant Examiner—Mark R. Buscher
Attorney, Agent, or Firm—Jordan B. Bierman

[57] ABSTRACT

An optical recording medium is disclosed, comprising a support having provided thereon a recording layer containing a naphtholactam dye represented by formula:

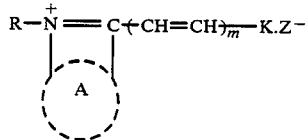

wherein K represents a substituted or unsubstituted aromatic amine residue; R represents a substituted or unsubstituted alkyl group, a substituted or unsubstituted cycloalkyl group, a substituted or unsubstituted aryl group, or a substituted or unsubstituted allyl group; $Z^-$ represents an anion; ring A represents a substituted or unsubstituted naphthalene ring; and m represents 1 or 2. The recording layer can be formed by coating easily, has a high reflectance to provide a satisfactory contrast of recording, and exhibits excellent resistance to light.

21 Claims, No Drawings

OPTICAL RECORDING MEDIUM

FIELD OF THE INVENTION

This invention relates to an optical recording medium. More particularly, it relates to an optical recording medium whose recording layer has a high reflectance and can be formed easily.

BACKGROUND OF THE INVENTION

Optical recording media using a laser beam, etc. including laser discs are capable of recording and preserving informations at high densities and reproducing the recorded informations easily.

Laser discs generally comprise a disc base having provided thereon a thin recording layer, on which a laser beam condensed to a diameter of about 1 $\mu$m is irradiated to carry out high-density recording. Upon absorption of energy of the irradiated laser beams, the recording layer undergoes thermal changes, such as decomposition, evaporation, dissolution, and the like to thereby make a difference in reflectance between the irradiated areas and the non-irradiated areas. Reproduction of the recorded informations can be carried out by reading the difference of reflectance.

Therefore, in order to effect high-density recording and precise reproduction, optical recording media are required to show efficient absorption of a laser beam having a specific wavelength used for recording and to highly reflect a laser beam having a specific wavelength used for reproduction.

Various structures are known for this type of optical recording media. For example, Japanese Patent Application (OPI) No. 97033/80 (the term "OPI" as used herein refers to a "published unexamined Japanese patent application") discloses a support having provided thereon a single layer of phthalocyanine dyes. However, phthalocyanine dyes have disadvantages, such as low sensitivity, high decomposition points which lead to difficulty in vacuum deposition, and very low solubility in organic solvents which lead to difficulty in coating for formation of the recording layer.

Japanese Patent Application (OPI) Nos. 83344/83 and 22479/83 disclose phenalene dyes and naphthoquinone dyes, respectively, to be coated as a recording layer. These dyes, though easy to evaporate in vacuo, show low reflectances. Low reflectances result in poor contrast in reflectance between the recorded areas and non-recorded areas, thus making it difficult to reproduce the recorded informations.

In addition, Japanese Patent Application (OPI) Nos. 24692/84, 67092/84, and 71895/84 disclose recording layers comprising cyanine dyes. The cyanine dyes have an advantage of easy coating but are inferior in light resistance and undergo deterioration due to light for reproduction.

SUMMARY OF THE INVENTION

One object of this invention is to provide an optical recording medium whose recording layer can be formed by coating easily.

Another object of this invention is to provide an optical recording medium whose recording layer has a high reflectance to provide a satisfactory contrast of recording.

A further object of this invention is to provide an optical recording medium having excellent resistance to light, particularly light for reproduction.

As a result of extensive investigations, it has now been found that the above objects can be accomplished easily by providing a recording layer containing a naphtholactam light-absorbing dye having a specific chemical structure.

The present invention relates to an optical recording medium comprising a support having provided thereon a recording layer containing a naphthostyril light-absorbing dye represented by formula (I):

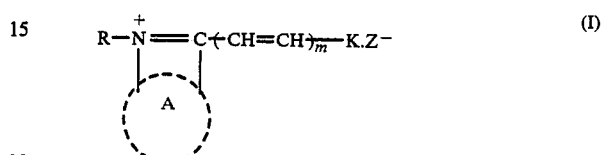

wherein K represents a substituted or unsubstituted aromatic amine residue; R represents a substituted or unsubstituted alkyl group, a substituted or unsubstituted cycloalkyl group, a substituted or unsubstituted aryl group, or a substituted or unsubstituted allyl group; Z⁻ represents an anion; ring A represents a substituted or unsubstituted naphthalene ring; and m represents 1 or 2.

DETAILED DESCRIPTION OF THE INVENTION

In formula (I), substituents for the alkyl, cycloalkyl, aryl or allyl group as represented by R include an alkoxy group, an alkoxyalkoxy group, an alkoxyalkoxyalkoxy group, an allyloxy group, an aryl group, an aryloxy group, a cyano group, a hydroxyl group, a tetrahydrofuryl group, a halogen atom, etc.

Substituents for the naphthalene ring as represented by ring A include a halogen atom, a cyano group, a thiocyanate group, an alkyl group having up to 10 carbon atoms, an alkoxy group having up to 10 carbon atoms, an alkylamino group, an acylamino group, an amino group, a hydroxyl group, and a like nonionic substituent.

The substituted or unsubstituted aromatic amine residue as represented by K include residual groups of heterocyclic amines containing a nitrogen atom, an oxygen atom or a sulfur atom, residual groups of tetrahydroquinolines, and groups represented by formula:

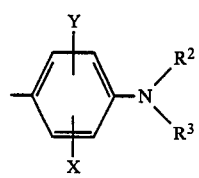

wherein X and Y each represents a hydrogen atom, an alkyl group, an acylamino group, an alkoxy group, or a halogen atom; and $R^2$ and $R^3$ each represents a hydrogen atom, a substituted or unsubstituted alkyl group having up to 20 carbon atoms, a substituted or unsubstituted aryl group, a substituted or unsubstituted allyl group, or a substituted or unsubstituted cycloalkyl group.

Substituted for the alkyl, aryl, allyl or cycloalkyl group as represented by $R^2$ or $R^3$ include an alkoxy group, an alkoxyalkoxy group, an alkoxyalkoxyalkoxy group, an allyloxy group, an aryl group, an aryloxy group, a cyano group, a hydroxyl group, a tetrahydrofuryl group, etc.

Anions represented by $Z^-$ include $I^-$, $Br^-$, $Cl^-$, $ClO_4^-$, $BF_4^-$, $SCN^-$,

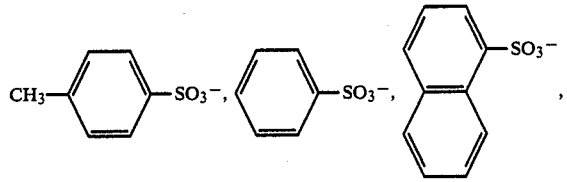

$PF_6^-$, $SiF_6^-$, $TiF_6^-$, 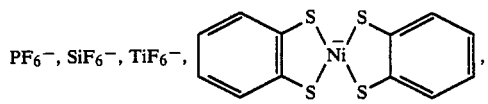

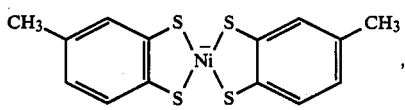

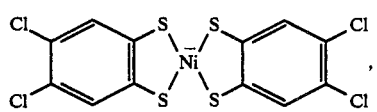

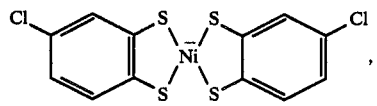

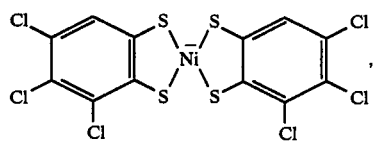

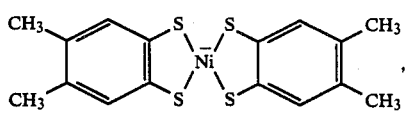

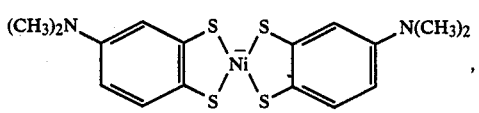

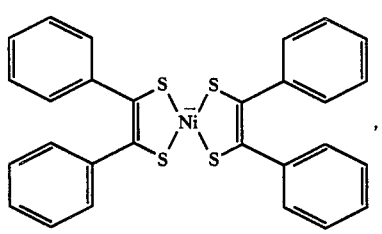

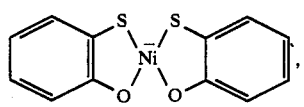

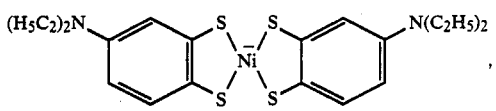

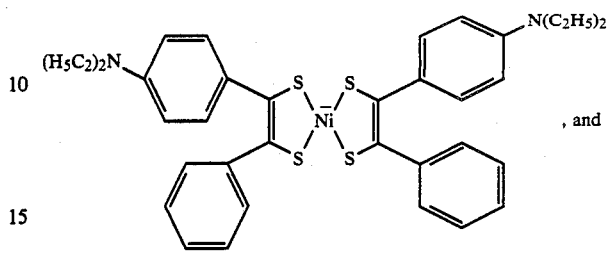, and

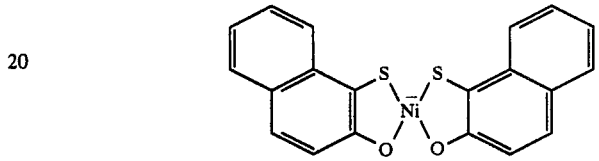

The naphtholactam dyes represented by formula (I) absorbs light in the wavelength region of from 600 to 900 nm and have a molecular absorption coefficient of from $10^4$ to $10^5$ cm$^{-1}$.

Among the naphtholactam dyes of formula (I), the preferred are those represented by formula (II):

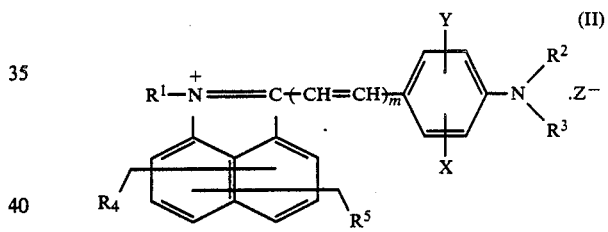

wherein X and Y each represents a hydrogen atom, a halogen atom, an alkyl group, an acylamino group, or an alkoxy group; $R^1$ represents a substituted or unsubstituted alkyl group, a substituted or unsubstituted cycloalkyl group, a substituted or unsubstituted aryl group, or a substituted or unsubstituted allyl group; $R^2$ and $R^3$ each represents a hydrogen atom, a substituted or unsubstituted alkyl group having up to 20 carbon atoms, a substituted or unsubstituted aryl group, a substituted or unsubstituted allyl group, or a substituted or unsubstituted cycloalkyl group; $R^4$ and $R^5$ each represents a hydrogen atom, a halogen atom, a cyano group, a thiocyanato group, an alkyl group having up to 10 carbon atoms, an alkoxy group having up to 10 carbon atoms, an alkylamino group, an acylamino group, an amino group, or a hydroxyl group; $Z^-$ represents an anion; and m represents 1 or 2.

In formula (II), substituents for the alkyl, aryl, allyl, or cycloalkyl group as represented by $R^2$ or $R^3$ include an alkoxy group, an alkoxyalkoxy group, an allyloxy group, an aryl group, an aryloxy group, a cyano group, a hydroxyl group, a tetrahydrofurfuryl group, a halogen atom, etc.

The more preferred of the naphthostyril dyes of formula (II) are those represented by formula (III):

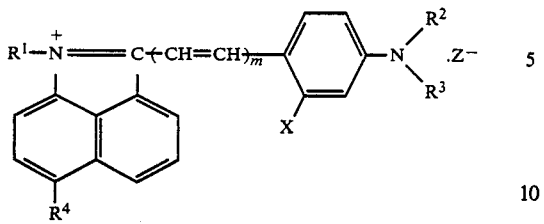 (III)

wherein X represents a hydrogen atom or a methyl group; $R^1$ represents an alkyl group having up to 8 carbon atoms, and preferably up to 5 carbon atoms, an alkyl group having up to 8 carbon atoms, and preferably up to 5 carbon atoms, which is substituted with an alkoxy group, preferably the one having up to 4 carbon atoms, an allyloxy group or a hydroxyl group, or an allyl group; $R^2$ and $R^3$ each represents an alkyl group having up to 8 carbon atoms, an alkyl group having up to 8 carbon atoms which is substituted with an alkoxy group, preferably the one having up to 4 carbon atoms, an alkoxyalkoxy group, preferably the one having up to 4 carbon atoms, an allyloxy group, a hydroxyl group or a halogen atom, or an allyl group; $R^4$ represents a hydrogen atom, a halogen atom, preferably a chlorine atom or a bromine atom, or a thiocyanate group; $Z^-$ represents an anion; and m represents 1 or 2.

The naphthostyril dyes represented by formula (II) can easily be prepared by condensing a compound represented by formula:

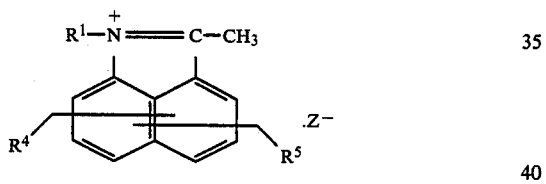

wherein $R^1$, $R^4$, $R^5$, and $Z^-$ are as defined for formula (II), with an aromatic aldehyde represented by formula:

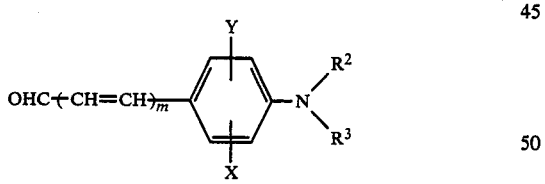

wherein X, Y, $R^2$, $R^3$, and m are as defined in formula (II).

The naphthostyril dyes of formula (II) can also be prepared by reacting a compound represented by formula:

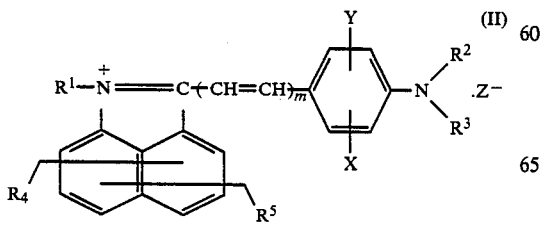 (II)

wherein $R^1$, $R^2$, $R^3$, $R^4$, $R^5$, X, Y, and m are as defined above; and $Z^-$ represents $I^-$, $Br^-$, $Cl^-$, $ClO_4^-$, $BF_4^-$, $SCN^-$, $PF_6^-$, $SiF_6^-$, $TiF_6^-$,

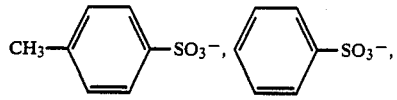

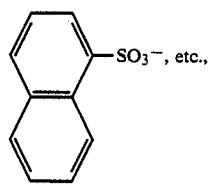 etc., with a compound represented by formula:

$Q^-.X^+$ wherein Q represents

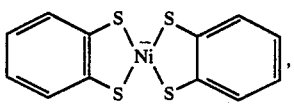

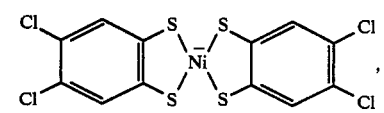

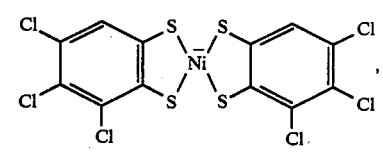

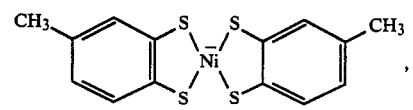

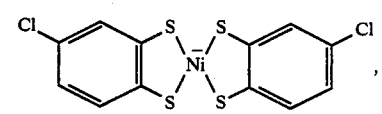

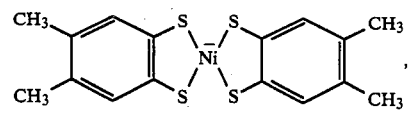

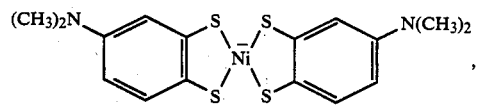

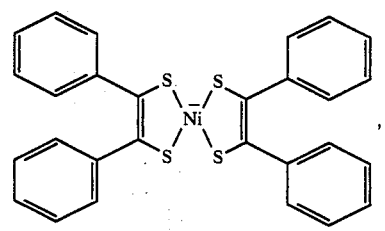

-continued

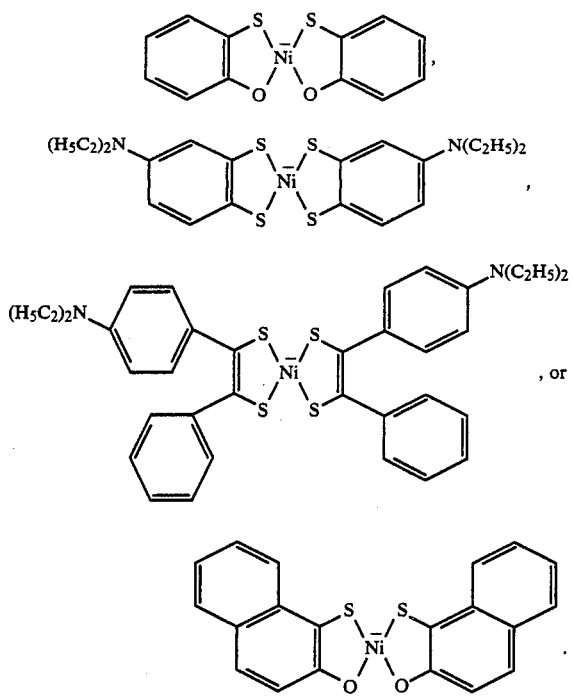

and X+ represents a tetraalkylammonium cation, etc., in a polar solvent under heating with stirring.

The optical recording medium according to the present invention essentially comprises a support and a recording layer and, if desired, may further comprise a subbing layer on the support and a protective layer on the recording layer.

The support to be used may be either transparent or opaque to a laser beam used. Any of supports usually employed for this type of recording media, such as glass, plastics, paper, metal plates or foils, etc., may be used, with plastics being preferred from various respects. The plastics to be used include acrylic resins, methacrylic resins, vinyl acetate resins, vinyl chloride resins, nitrocellulose, polyethylene resins, polypropylene resins, polycarbonate resins, polyimide resins, polysulfone resins, and the like.

The recording layer of the optical recording medium of the invention has a thickness of from 100 Å to 5 μm, and preferably from 500 Å to 3 μm.

The recording layer can be formed by a commonly employed thin film formation techniques, such as a vacuum deposition process, a sputtering process, a doctor blade coating process, a casting process, a spinner coating process, a dip coating process, and the like.

In the formation of the recording layer, a binder may be simultaneously used in a naphthostyril type light absorbing dyes. Usable binders include polymers, such as polyvinyl alcohol, polyvinylpyrrolidone, nitrocellulose, cellulose acetate, polyvinyl butyral, polycarbonate, etc. The recording layer preferably contains at least 1% by weight of the naphthostyril dye based on the polymer binder.

In the case of coating the recording layer by the above-described doctor blade coating process, casting process, spinner coating process, dip coating process, and the like, and particularly spinner coating process, a solvent for coating is employed. Suitable solvents to be used include those having a boiling point of from 120° to 160° C., e.g., bromoform, dibromoethane, tetrachloroethane, ethyl cellosolve, xylene, chlorobenzene, cyclohexanone, etc. In the case of film formation by the spinner coating process, a rotational speed preferably ranges from 500 to 5,000 rpm, and the spin-coated layer may be heated or treated with a solvent vapor, if necessary.

For the purpose of ensuring stability or light resistance of the recording layer, the recording layer may contain, as a singlet state oxygen quencher, a transition metal chelate compound, e.g., acetylacetonato chelates, bisphenyldithiol, salicylaldehyde oxime chelates, bisdithiol-α-diketone, etc.

The recording layer according to the present invention may further contain other dyes in addition to the naphthostyril dyes of formula (I), such as naphthostyril dyes other than those of the present invention, indophenol dyes, triarylmethane dyes, azo dyes, cyanine dyes, squalilium dyes, etc.

The recording layer of the optical recording medium according to the present invention may be provided on either a single side or both sides of a support.

Recording on the optical recording medium of the invention can be performed by irradiating the recording layer provided on one or both sides of the support with a laser beam, and preferably a semiconductor laser beam, condensed to a diameter of about 1 μm. The laser irradiation induces thermal deformation of the recording layer due to energy absorption, such as decomposition, evaporation, melting, and the like, to thereby effect recording.

Reproduction of the thus recorded information can be carried out by irradiating a laser beam to read a difference in reflectance between the area where such a thermal deformation has taken place and the area where no thermal deformation has taken place.

The laser beams which can be used for recording and reproduction include laser beams of $N_2$, He—Cd, Ar, He—Ne, ruby, semiconductors, dyes, and the like. Of these, semiconductor laser beams are preferred in view of their lightweight, small size, and ease on handling.

This invention will now be illustrated in greater detail with reference to the following examples, but it should be understood that they are not intended to limit the present invention.

EXAMPLE 1

Synthesis of Naphthostyril Dye

To a mixture of 250 g of glacial acetic acid and 50 g of acetic anhydride were added 39.0 g of a compound of formula:

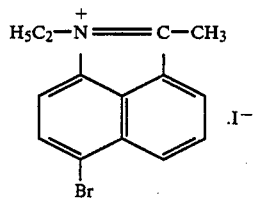

and 19.1 g of a compound of formula:

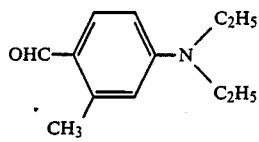

and the mixture was heated at 100° to 105° C. for 4 hours with stirring. After completion of the reaction, the reaction mixture was cooled to room temperature, and poured into 1.5 liters of water containing 16.0 g of sodium perchlorate, followed by stirring at room temperature for 8 hours. The formed crystals were collected by filtration and dried to obtain 45 g of a naphthostyril dye having the following formula as a dark green crystals. A chloroform solution of this dye showed a $\lambda_{max}$ of 740 nm.

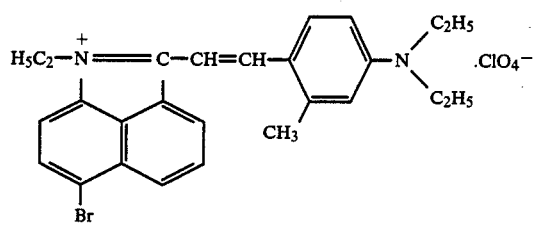

Production of Optical Recording Medium

One gram of the naphthostyril dye as above prepared was dissolved in ethyl cellosolve, followed by filtration through a filter of 0.22 μm, 2 ml of thus obtained solution was dropped on a substrate of polycarbonate resin disc having a diameter of 130 mm which had been grooved to a depth of 700 Å and a width of 0.7 μm, and coated by a spinner at 800 rpm, followed by drying at 60° C. for 20 minutes. For film thickness measurement, a glass plate was separately coated with the coating solution under the same conditions as above, and the film thickness was measured by means of Talystep (Rank Taylor Hobson KK) and was found to be 650 Å. The coated film exhibited its absorption maximum at a wavelength of 790 nm and a broad peak width.

When a semiconductor laser beam having a center wavelength of 830 nm and a beam diameter of 1 μm was irradiated on the coated film at an output of 6 mW, clear-outlined pits having a width of about 1 μm and a pit length of about 2 μm were formed. The carrier level/noise level ratio (C/N ratio) of the pits was 52 dB. The coating film exhibited satisfactory light resistance and resistance to reproducing light.

EXAMPLE 2

A naphthostyril dye of the formula shown below was synthesized in the same manner as described in Example 1. A chloroform solution of the dye had a $\lambda_{max}$ of 740 nm.

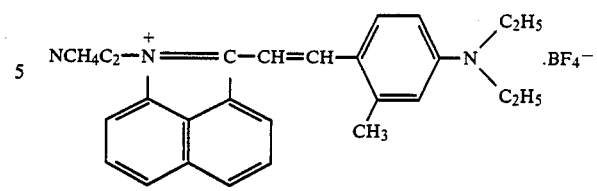

One gram of the naphthostyril dye thus obtained was dissolved in 50 g of dibromoethane, followed by filtration through a filter of 0.22 μm. 2 ml of the resulting solution was dropped on a substrate of methyl methacrylate resin (hereinafter referred to as PMMA) disc having a diameter of 120 mm which had been grooved to a depth of 700 Å and a width of 0.7 μm and coated by a spinner at 1200 rpm, followed by drying at 60° C. for 10 minutes. The film thickness was measured in the same manner as in Example 1 and was found to be 700 Å. The coating film showed its absorption maximum at 790 nm with a broad peak width.

When a semiconductor laser beam having a center wavelength of 830 nm and a beam diameter of about 1 μm was irradiated on the coated film at an output of 6 mW, clear-outlined pits having a width of about 1 μm and a pit length of about 2 μm were formed. The C/N ratio of the pits was 48 dB. The coating film showed satisfactory light resistance and resistance to reproducing light.

EXAMPLE 3

Synthesis of Naphthostyril Dye

To 50 ml of N,N-dimethylformamide were added 6.48 g of a dye having formula:

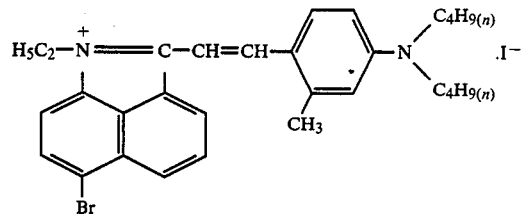

and 6.20 g of a compound of formula:

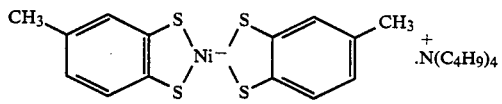

and the mixture was heated at 90° to 100° C. for 3 hours. After cooling, the reaction mixture was poured into 300 ml of water, and the mixture was stirred at room temperature for 1 hour. The thus precipitated crystals were collected by filtration and dried to obtain 10.20 g of dark green crystals represented by the formula shown below. A chloroform solution of the product had a $\lambda_{max}$ of 745 nm.

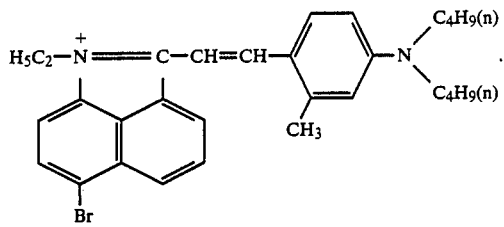
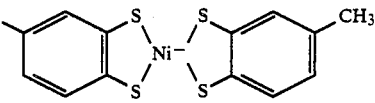

Production of Optical Recording Medium

One gram of the naphthostyril dye as above prepared was dissolved in 50 g of tetrachloroethane, and the solution was filtered through a filter of 0.2 μm. 2 ml of the resulting solution was dropped on a substrate of PMMA disc having a diameter of 130 mm which had been grooved to a depth of 700 Å and a width of 0.7 μm and coated thereon by a spinner at 800 rpm, followed by drying at 60° C. for 20 minutes. The film thickness was measured in the same manner as in Example 1 and was found to be 700 Å. The coated film exhibited its absorption maximum at 790 nm with a broad peak width.

When a semiconductor laser beam having a center wavelength of 830 nm and a beam diameter of 1 μm was irradiated on the coated film at an output of 6 mW, clear-outlined pits having a width of about 1 μm and a pit length of about 2 μm were formed. The C/N ratio of the pits was 52 dB. The coated film exhibited satisfactory light resistance and resistance to reproducing light.

EXAMPLES 4 TO 95

In the same manner as described in Example 1, naphthostyril dyes shown in Table 1 were synthesized. The wavelength of the absorption maximum of each of the resulting dye in its chloroform solution was as shown in Table 1.

Each of the resulting dyes was coated on a substrate of grooved polycarbonate resin disc in the same manner as in Example 1. The wavelength of the absorption maximum of the coating film was as shown in Table 1.

When a semiconductor laser beam having a center wavelength of 830 nm was irradiated on the coated film, clearly outlined pits were formed. The thus formed recording layer had a high reflectance, high sensitivity, and an excellent C/N ratio, and exhibited satisfactory light resistance and resistance to reproducing light.

TABLE 1
Naphthostyril Dye
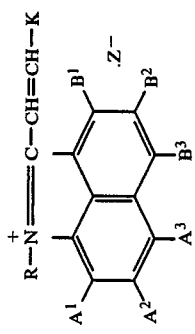
| Example No. | —R | —A$^1$ | —A$^2$ | —A$^3$ | —B$^1$ | —B$^2$ | —B$^3$ | —K | Z$^-$ | λ max (in CHCl$_3$) (nm) | λ max (coating film) (nm) |
|---|---|---|---|---|---|---|---|---|---|---|---|
| 4 | —C$_2$H$_5$ | —H | —H | —H | —H | —H | —H | 3-CH$_3$-4-[N(C$_4$H$_9$(n))$_2$]C$_6$H$_3$— | I$^-$ | 740 | 790 |
| 5 | " | " | " | —Br | " | " | " | 3-CH$_3$-4-[N(CH$_3$)$_2$]C$_6$H$_3$— | ClO$_4^-$ | 735 | 780 |
| 6 | " | " | " | " | " | " | " | 3-CH$_3$-4-[N(C$_4$H$_9$(n))$_2$]C$_6$H$_3$— | " | 745 | 790 |
| 7 | " | " | " | " | " | " | " | 3-CH$_3$-4-[N(C$_3$H$_7$(n))$_2$]C$_6$H$_3$— | " | 745 | 785 |

TABLE 1-continued
Naphthostyril Dye
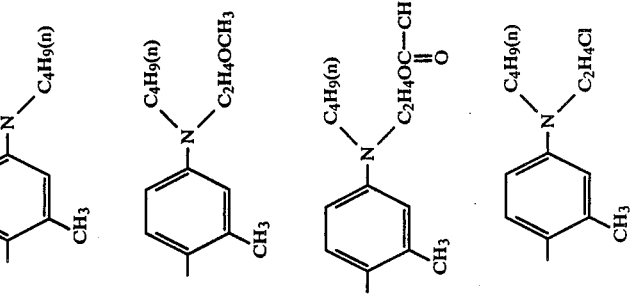
| Example No. | —R | —A$^1$ | —A$^2$ | —A$^3$ | —B$^1$ | —B$^2$ | —B$^3$ | —K | Z$^-$ | λ max (in CHCl$_3$) (nm) | λ max (coating film) (nm) |
|---|---|---|---|---|---|---|---|---|---|---|---|
| 8 | " | " | " | " | " | " | " | N(C$_2$H$_5$)(C$_4$H$_9$(n))-3-methyl-4-methylphenyl | " | 745 | 790 |
| 9 | " | " | " | " | " | " | " | N(C$_4$H$_9$(n))(C$_2$H$_4$OCH$_3$)-3-methyl-4-methylphenyl | " | 740 | 780 |
| 10 | " | " | " | " | " | " | " | N(C$_4$H$_9$(n))(C$_2$H$_4$OC(=O)CH$_3$)-3-methyl-4-methylphenyl | " | 735 | 775 |
| 11 | " | " | " | " | " | " | " | N(C$_4$H$_9$(n))(C$_2$H$_4$Cl)-3-methyl-4-methylphenyl | " | 730 | 770 |

TABLE 1-continued
Naphthostyril Dye
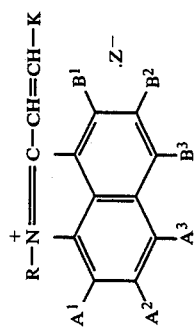
| Example No. | —R | —A¹ | —A² | —A³ | —B¹ | —B² | —B³ | —K | Z⁻ | λ max (in CHCl₃) (nm) | λ max (coating film) (nm) |
|---|---|---|---|---|---|---|---|---|---|---|---|
| 12 | | " | " | " | " | " | " | N(C₄H₉(n))(C₂H₄OCOCH₃), 3-CH₃ phenyl, O | " | 735 | 780 |
| 13 | " | " | " | " | " | " | " | N(C₄H₉(n))(C₂H₄COC₂H₅), 3-CH₃ phenyl, O | " | 735 | 780 |
| 14 | " | " | " | " | " | " | " | N(C₄H₉(n))(C₂H₄CN), 3-CH₃ phenyl | " | 720 | 760 |
| 15 | " | " | " | " | " | " | " | N(C₄H₉(n))(C₂H₄OC₂H₄OCH₃), 3-CH₃ phenyl | " | 740 | 780 |

TABLE 1-continued
Naphthostyril Dye
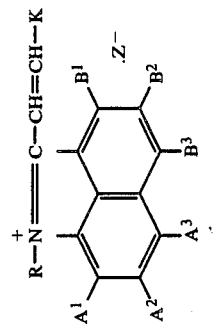
| Example No. | —R | —A$^1$ | —A$^2$ | —A$^3$ | —B$^1$ | —B$^2$ | —B$^3$ | —K | Z$^-$ | λ max (in CHCl$_3$) (nm) | λ max (coating film) (nm) |
|---|---|---|---|---|---|---|---|---|---|---|---|
| 16 | " | " | " | " | " | " | " | )(C2H4OC6H5) with 3-CH3-4-tolyl) | " | 735 | 775 |
| 17 | " | " | " | " | " | " | " | N(C4H9(n))(C2H4C6H5) with 3-CH3-4-tolyl | " | 735 | 775 |
| 18 | " | " | " | " | " | " | " | N(C4H9(n))(CH2C6H5) with 3-CH3-4-tolyl | " | 725 | 765 |
| 19 | " | " | " | " | " | " | " | N(C4H9(n))(C2H4OH) with 3-CH3-4-tolyl | " | 740 | 780 |

TABLE 1-continued
Naphthostyril Dye
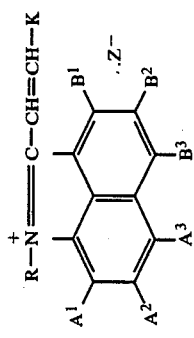
| Example No. | —R | —A¹ | —A² | —A³ | —B¹ | —B² | —B³ | —K | Z⁻ | λ max (in CHCl₃) (nm) | λ max (coating film) (nm) |
|---|---|---|---|---|---|---|---|---|---|---|---|
| 20 | " | " | " | " | " | " | " | ![K group with C4H9(n), C2H4O-C6H4-NO2, and 3-methylphenyl on N] | " | 735 | 775 |
| 21 | " | " | " | " | " | " | " | ![K group with C4H9(n), CH2-tetrahydrofuran, and 3-methylphenyl on N] | " | 740 | 780 |
| 22 | " | " | " | " | " | " | " | ![K group with C4H9(n), C2H4O-C6H4-Cl, and 3-methylphenyl on N] | " | 735 | 775 |
| 23 | " | " | " | " | " | " | " | ![K group with N(C2H5)2 on 2-OCH3-5-CH3-phenyl] | " | 765 | 800 |

TABLE 1-continued
Naphthostyril Dye
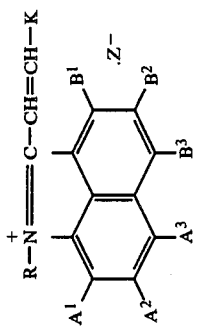
| Example No. | —R | —A¹ | —A² | —A³ | —B¹ | —B² | —B³ | —K | Z⁻ | λ max (in CHCl₃) (nm) | λ max (coating film) (nm) |
|---|---|---|---|---|---|---|---|---|---|---|---|
| 24 | " | " | " | " | " | " | " | ![K group with N(C₂H₅)₂, NHCOCH₃, CH₃] | " | 780 | 820 |
| 25 | " | " | " | " | " | " | " | ![K group with Cl, N(C₂H₅)₂, NHCOCH₃, CH₃] | " | 760 | 800 |
| 26 | " | " | " | " | " | " | " | ![K group with OCH₃, N(C₂H₅)₂, NHCOCH₃, CH₃] | I⁻ | 800 | 845 |
| 27 | " | " | " | " | " | " | " | ![K group with CH₃, N(C₂H₅)₂, OCH₃, CH₃] | " | 770 | 815 |

TABLE 1-continued
Naphthostyril Dye

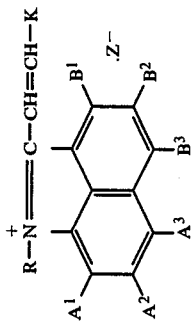

| Example No. | —R | —A$^1$ | —A$^2$ | —A$^3$ | —B$^1$ | —B$^2$ | —B$^3$ | —K | Z$^-$ | λ max (in CHCl$_3$) (nm) | λ max (coating film) (nm) |
|---|---|---|---|---|---|---|---|---|---|---|---|
| 28 | " | " | " | " | " | " | " | 4-CH$_3$-3-Cl-C$_6$H$_3$-N(C$_6$H$_{13}$(n))$_2$ | " | 715 | 755 |
| 29 | " | " | " | " | " | " | " | 4-CH$_3$-C$_6$H$_4$-N(C$_4$H$_9$(n))$_2$ | " | 725 | 760 |
| 30 | " | " | " | " | " | " | " | 4-CH$_3$-3-CH$_3$-C$_6$H$_3$-N(C$_2$H$_5$)(C$_2$H$_4$N(C$_2$H$_5$)$_2$) | " | 735 | 770 |
| 31 | " | " | " | " | " | " | " | 4-CH$_3$-3-CH$_3$-C$_6$H$_3$-N(C$_2$H$_5$)(C$_2$H$_4$NH$_2$) | " | 735 | 755 |
| 32 | " | " | " | " | " | " | " | 4-CH$_3$-3-CH$_3$-C$_6$H$_3$-N(C$_2$H$_5$)(C$_2$H$_4$–$\overset{\oplus}{N}$(CH$_3$)$_3$) I$^\ominus$ | " | 735 | 775 |

TABLE 1-continued
Naphthostyril Dye
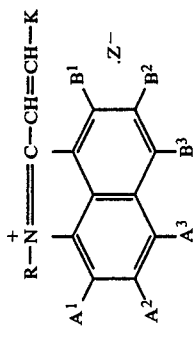
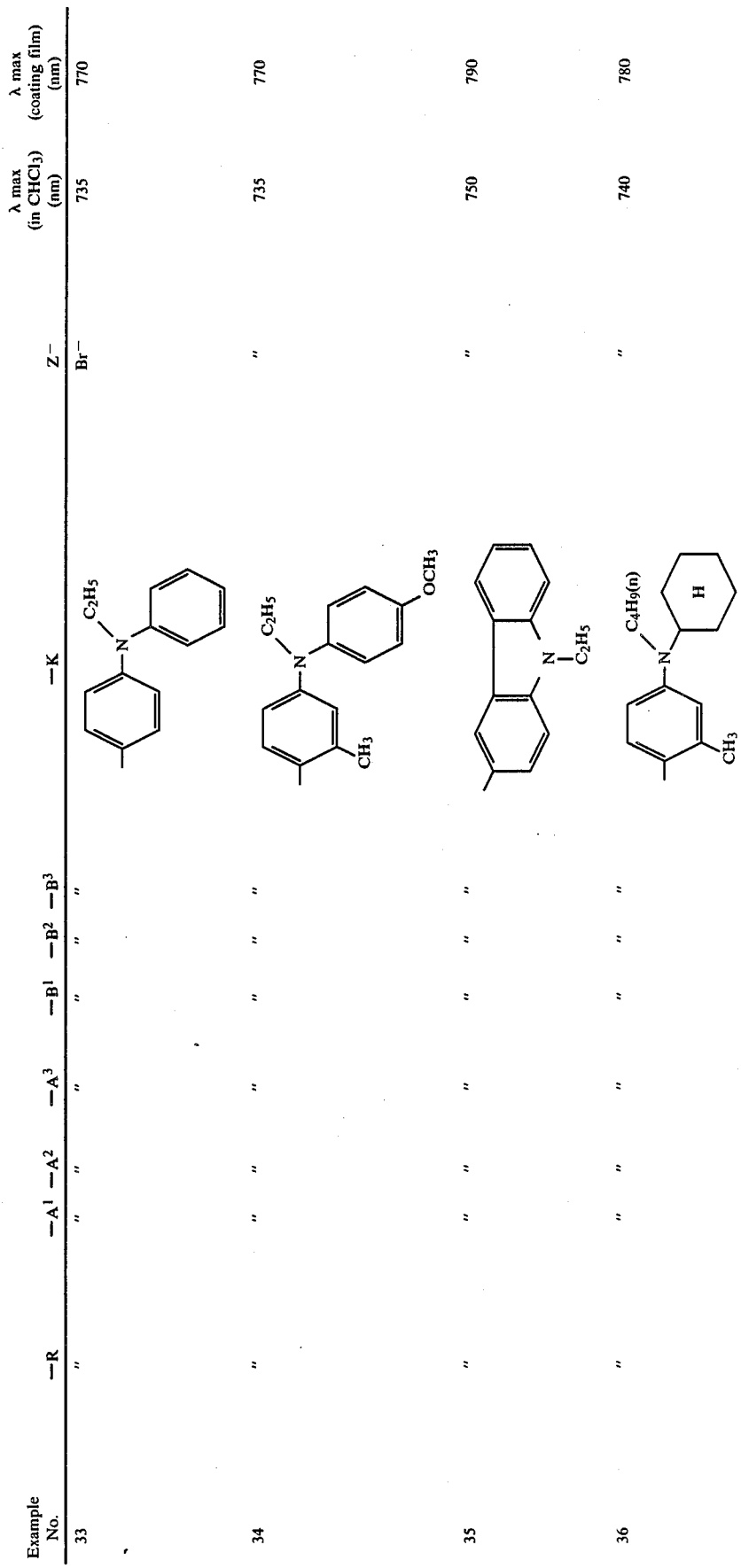
| Example No. | —R | —A¹ | —A² | —A³ | —B¹ | —B² | —B³ | —K | Z⁻ | λ max (in CHCl₃) (nm) | λ max (coating film) (nm) |
|---|---|---|---|---|---|---|---|---|---|---|---|
| 33 | | | | | | | | | Br⁻ | 735 | 770 |
| 34 | " | " | " | " | " | " | " | | " | 735 | 770 |
| 35 | " | " | " | " | " | " | " | | " | 750 | 790 |
| 36 | " | " | " | " | " | " | " | | " | 740 | 780 |

TABLE 1-continued

Naphthostyril Dye $$R-\overset{+}{N}=C-CH=CH-K \quad Z^-$$
(with naphthalene ring bearing $A^1, A^2, A^3, B^1, B^2, B^3$)

| Example No. | —R | —A¹ | —A² | —A³ | —B¹ | —B² | —B³ | —K | Z⁻ | λ max (in CHCl₃) (nm) | λ max (coating film) (nm) |
|---|---|---|---|---|---|---|---|---|---|---|---|
| 37 | " | " | " | " | " | " | " | 4-[N(C₈H₁₇(n))₂]-3-CH₃-C₆H₃ | " | 745 | 785 |
| 38 | " | " | " | " | " | " | " | 4-[N(C₃H₇(i))(C₂H₅)]-3-CH₃-C₆H₃ | " | 745 | 785 |
| 39 | " | " | " | " | " | " | " | 4-[N(C₂H₅)₂]-3-NHCOOCH₃-C₆H₃ | " | 760 | 800 |
| 40 | " | " | " | " | " | " | " | 4-[N(C₂H₅)₂]-3-NHSO₂CH₃-C₆H₃ | BF₄⁻ | 755 | 795 |

TABLE 1-continued

Naphthostyril Dye $$\text{R}-\overset{+}{\text{N}}=\text{C}-\text{CH}=\text{CH}-\text{K} \quad Z^-$$

with substituents $A^1, A^2, A^3, B^1, B^2, B^3$ on the naphthalene ring

| Example No. | —R | —A¹ | —A² | —A³ | —B¹ | —B² | —B³ | —K | Z⁻ | λ max (in CHCl₃) (nm) | λ max (coating film) (nm) |
|---|---|---|---|---|---|---|---|---|---|---|---|
| 41 | —C₃H₇(n) | " | " | " | " | " | " | ―N(C₂H₅)₂-(3-CH₃-C₆H₃)― | " | 740 | 780 |
| 42 | —C₅H₁₁(n) | " | " | " | " | " | " | " | " | 740 | 780 |
| 43 | —CH₂—C₆H₅ | " | " | " | " | " | " | " | " | 745 | 780 |
| 44 | —CH₂—C₆H₅ | " | " | " | " | " | " | " | " | 745 | 785 |
| 45 | —C₂H₄OCH₃ | " | " | " | " | " | " | " | " | 740 | 780 |
| 45 | —CH₂CH₂OCH₃ | " | " | " | " | " | " | " | " | 740 | 780 |
| 46 | —C₃H₇—C₆H₅ | " | " | " | " | " | " | " | C₆H₅—SO₃⁻ | 740 | 780 |
| 48 | —C₂H₄O—C₆H₅ | " | " | " | " | " | " | " | " | 740 | 790 |

TABLE 1-continued

Naphthostyril Dye $$R-\overset{+}{N}=C-CH=CH-K \quad Z^-$$

(with naphthalene ring bearing substituents $A^1, A^2, A^3$ and $B^1, B^2, B^3$)

| Example No. | —R | —A¹ | —A² | —A³ | —B¹ | —B² | —B³ | —K | Z⁻ | λ max (in CHCl₃) (nm) | λ max (coating film) (nm) |
|---|---|---|---|---|---|---|---|---|---|---|---|
| 49 | —C₂H₄OC₂H₄OCH₃ | " | " | " | " | " | " | " | " | 740 | 790 |
| 50 | —C₂H₄OC₂H₄OC₂H₄OCH₃ | " | " | " | " | " | " | " | " | 740 | 790 |
| 51 | —C₂H₄OCH₂CH=CH₂ | " | " | " | " | " | " | " | " | 740 | 785 |
| 52 | —CH₂CH=CH₂ | " | " | " | " | " | " | " | " | 745 | 785 |
| 53 | methylcyclohexyl (—H ring) | " | " | " | " | " | " | " | " | 740 | 790 |
| 54 | —C₂H₄OCH₂CH=CH₂ | " | " | " | " | " | " | " | " | ClO₄⁻ | 740 | 780 |
| 55 | —C₂H₄OH | " | " | " | " | " | " | " | " | 740 | 780 |
| 56 | —C₂H₄Cl | " | " | " | " | " | " | " | " | SCN⁻ | 745 | 785 |
| 57 | tetrahydrofurfuryl-CH₂— | " | " | " | " | " | " | " | " | 740 | 770 |
| 58 | —C₂H₄CN | " | " | " | " | " | " | " | " | 745 | 780 |
| 59 | " | " | " | —H | " | " | " | " | " | 740 | 775 |
| 60 | " | " | " | —N(CH₃)₂ | " | " | " | " | " | 780 | 820 |
| 61 | " | " | " | —H | " | " | " | —C₆H₃(CH₃)-N(C₄H₉(n))₂ | ClO₄⁻ | 745 | 760 |

TABLE 1-continued

Naphthostyryl Dye $$\underset{A^1\ A^2\ A^3}{\overset{B^1\ B^2\ B^3}{\underset{R-N^+=C-CH=CH-K}{\text{naphthalene}}}} Z^-$$

| Example No. | —R | —A$^1$ | —A$^2$ | —A$^3$ | —B$^1$ | —B$^2$ | —B$^3$ | —K | Z$^-$ | λ max (in CHCl$_3$) (nm) | λ max (coating film) (nm) |
|---|---|---|---|---|---|---|---|---|---|---|---|
| 62 | —R | " | " | " | " | " | " | —N(C$_5$H$_{11}$(n))$_2$ on 3-CH$_3$-phenyl | " | 745 | 785 |
| 63 | —C$_2$H$_5$ | " | " | —N(CH$_3$)$_2$ | " | " | " | —N(C$_2$H$_5$)$_2$ on 4-CH$_3$-phenyl | 4-CH$_3$-C$_6$H$_4$-SO$_3^-$ | 740 | 780 |
| 64 | " | " | " | —Cl | " | " | " | —N(C$_2$H$_5$)$_2$ on 3-CH$_3$-phenyl | C$_6$H$_5$-SO$_3^-$ | 740 | 770 |
| 65 | " | —Br | " | —Br | " | " | " | " | 1-naphthyl-SO$_3^-$ | 745 | 775 |
| 66 | " | —H | " | —OCH$_3$ | " | " | " | " | " | 750 | 790 |
| 67 | " | " | " | —NHCH$_3$ | " | " | " | " | " | 760 | 795 |

TABLE 1-continued

Naphthostyril Dye

Structure: R—N⁺≡C—CH=CH—K with naphthalene ring bearing A¹, A², A³, B¹, B², B³ substituents and Z⁻ counterion

| Example No. | —R | —A¹ | —A² | —A³ | —B¹ | —B² | —B³ | —K | Z⁻ | λ max (in CHCl₃) (nm) | λ max (coating film) (nm) |
|---|---|---|---|---|---|---|---|---|---|---|---|
| 68 | " | " | " | —Br | " | " | " | ![K group: 4-methylphenyl with N(C₂H₅)(CH₂C(CH₃)₂CH₃) and ortho CH₃] | ClO₄⁻ | 760 | 790 |
| 69 | " | " | " | " | " | " | " | ![K group: 4-methylphenyl (H₃C) with N(C₂H₅)(CH₂C(CH₃)₂CH₃) and ortho CH₃] | " | 780 | 810 |
| 70 | " | " | " | " | " | " | " | ![K group: benzomorpholine with N—C₂H₄OCH₂CH=CH₂ and methyl] | " | 760 | 800 |
| 71 | " | " | " | " | " | " | " | ![K group: 5-methylquinoline with 8-NHC₄H₉(n)] | " | 785 | 815 |

TABLE 1-continued
Naphthostyril Dye
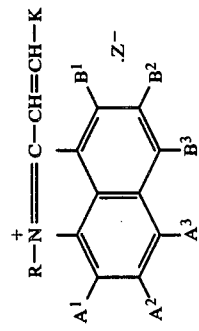
| Example No. | —R | —A¹ | —A² | —A³ | —B¹ | —B² | —B³ | —K | Z⁻ | λ max (in CHCl₃) (nm) | λ max (coating film) (nm) |
|---|---|---|---|---|---|---|---|---|---|---|---|
| 72 | " | " | " | " | " | " | " | 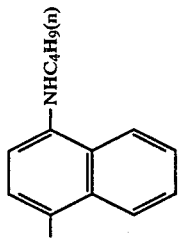 | " | 785 | 810 |
| 73 | " | " | " | " | " | " | " | 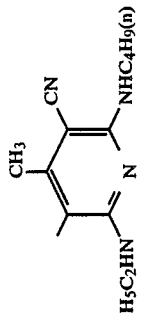 | " | 770 | 800 |
| 74 | " | " | " | " | " | " | " | 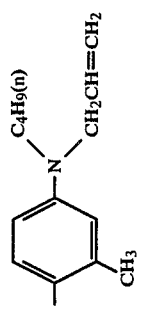 | " | 740 | 790 |
| 75 | " | " | " | " | " | " | " | 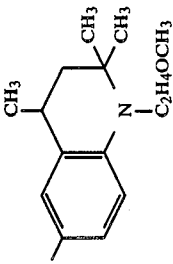 | " | 755 | 790 |

TABLE 1-continued

Naphthostyril Dye $$\begin{array}{c} R-\overset{+}{N}=C-CH=CH-K \\ \text{(naphthalene with } A^1, A^2, A^3, B^1, B^2, B^3 \text{ substituents)} \quad Z^- \end{array}$$

| Example No. | —R | —A¹ | —A² | —A³ | —B¹ | —B² | —B³ | —K | Z⁻ | λ max (in CHCl₃) (nm) | λ max (coating film) (nm) |
|---|---|---|---|---|---|---|---|---|---|---|---|
| 76 | —R | " | " | " | " | " | " | (2,4-dimethyl-N-(2,2-dimethyl-...)-N-(C₂H₄OCH₃) substituted phenyl group with CH₃, CH₃, CH₃ groups) | " | 775 | 805 |
| 77 | " | " | " | —OH | " | " | " | (1-ethyl-6-methyl-1,2,3,4-tetrahydroquinoline) | " | 755 | 795 |
| 78 | " | " | " | —NH₂ | " | " | " | (8-(NHC₂H₄OH)-5-methylquinoline) | " | 775 | 810 |
| 79 | " | " | —NHC₂H₅ | " | " | " | " | (1-(NHC₂H₄OC₂H₄OH)-4-methylnaphthalene) | " | 775 | 805 |

TABLE 1-continued
Naphthostyril Dye
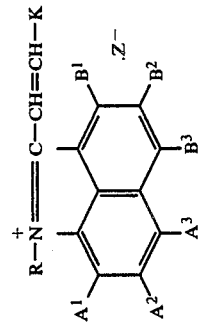
| Example No. | —R | —A$^1$ | —A$^2$ | —B$^1$ | —B$^2$ | —B$^3$ | —K | Z$^-$ | λ max (in CHCl$_3$) (nm) | λ max (coating film) (nm) |
|---|---|---|---|---|---|---|---|---|---|---|
| 80 | | " | —NHCOCH$_3$ | " | " | " | 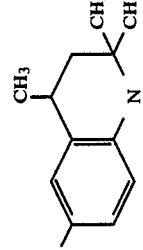 | " | 755 | 800 |
| 81 | " | " | 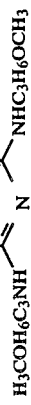 | " | " | " |  | " | 740 | 770 |
| 82 | " | " | —Br | " | " | " | 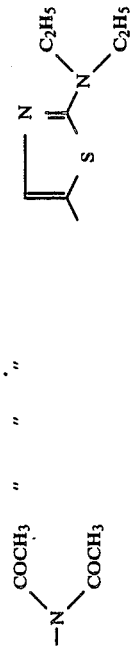 | " | 750 | 780 |
| 83 | " | —Br | " | " | " | " | 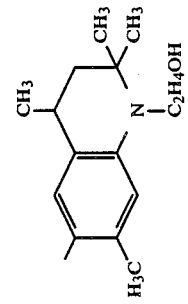 | " | 780 | 820 |

TABLE 1-continued
Naphthostyril Dye
R—N⁺≡C—CH=CH—K  (with A¹, A², A³, B¹, B², B³ substituents on naphthalene), Z⁻
| Example No. | —R | —A¹ | —A² | —A³ | —B¹ | —B² | —B³ | —K | Z⁻ | λ max (in CHCl₃) (nm) | λ max (coating film) (nm) |
|---|---|---|---|---|---|---|---|---|---|---|---|
| 84 | " | " | " | " | " | " | " | 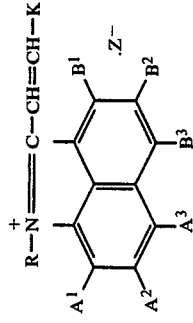 | " | 750 | 770 |
| 85 | " | " | " | " | " | " | —Br | 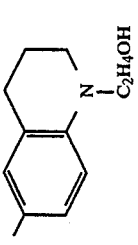 | " | 775 | 800 |
| 86 | " | " | —CH₃ | " | " | " | " | 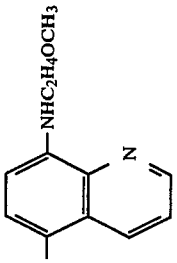 | " | 775 | 805 |
| 87 | " | " | —C₂H₅ | " | " | " | —C₂H₅ | 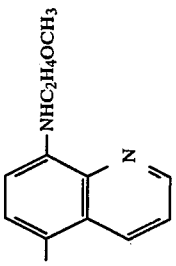 | " | 755 | 790 |
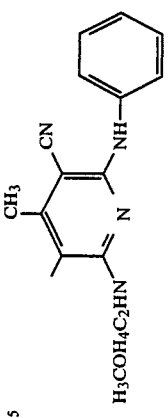

TABLE 1-continued
Naphthostyril Dye
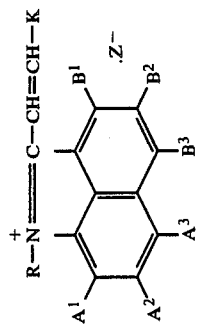
| Example No. | —R | —A¹ | —A² | —A³ | —B¹ | —B² | —B³ | —K | Z⁻ | λ max (in CHCl₃) (nm) | λ max (coating film) (nm) |
|---|---|---|---|---|---|---|---|---|---|---|---|
| 88 | " | —H | " | —H | —H | " | —H | ![K group with thiophene N(C₂H₅)₂] | " | 740 | 780 |
| 89 | " | " | " | —SCN | " | " | " | ![K group N(C₄H₉(n))₂ with CH₃ phenyl] | SCN⁻ | 748 | 780 |
| 90 | " | " | " | " | " | " | " | ![K group N(C₃H₇(n))₂ with CH₃ phenyl] | " | 745 | 770 |
| 91 | " | " | " | " | " | " | " | ![K group N(C₂H₅)₂ with CH₃ phenyl] | " | 740 | 765 |
| 92 | " | " | " | —Br | " | " | " | ![K group N(C₄H₉(n))₂ with CH₃ phenyl] | " | 747 | 780 |

TABLE 1-continued
Naphthostyril Dye
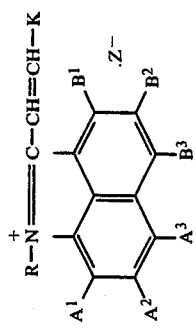
| Example No. | —R | —A$^1$ | —A$^2$ | —A$^3$ | —B$^1$ | —B$^2$ | —B$^3$ | —K | Z$^-$ | λ max (in CHCl$_3$) (nm) | λ max (coating film) (nm) |
|---|---|---|---|---|---|---|---|---|---|---|---|
| 93 | " | " | " | " | " | " | " | " | PF$_6^-$ | 748 | 780 |
| 94 | " | " | " | " | " | " | " | " | SiF$_6^-$ | 750 | 780 |
| 95 | " | " | " | " | " | " | " | " | TiF$_6^-$ | 750 | 780 |

EXAMPLES 96 TO 184

In the same manner as described in Example 3, naphthostyril dyes shown in Table 2 were synthesized. Each of the resulting naphtolactam dyes was coated on a substrate of grooved PMMA disc in the same manner as in Example 1 to form a coated film. The wavelength of the maximum absorption of the coated film was shown in Table 2.

When a laser beam having a center wavelength of 830 nm was irradiated on the coated film, clear-outlined pits were formed. The coated film had a high reflectance, high sensitivity, and an excellent C/N ratio and exhibited satisfactory light resistance and resistance to reproducing light.

TABLE 2
Naphthostyril Dye
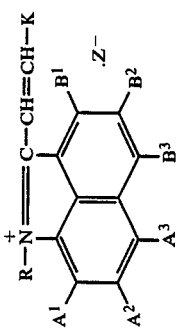
| Example No. | —R | —A¹ | —A² | —A³ | —B¹ | —B² | —B³ | —K | Z⁻ | λ max (coating film) (nm) |
|---|---|---|---|---|---|---|---|---|---|---|
| 96 | —C₂H₅ | —H | —H | —Br | —H | —H | —H | OCH₃–C₆H₃(CH₃)–N(C₄H₉(n))₂ | Ni(S₂C₆H₃CH₃)₂ | 740 |
| 97 | —C₂H₄CN | —H | —H | —H | —H | —H | —H | C₆H₃(CH₃)–N(C₂H₅)₂ | Ni(S₂C₆H₃CH₃)₂ | 740 |
| 98 | —C₂H₅ | —H | —H | —Br | —H | —H | —H | C₆H₃(CH₃)–N(CH₃)₂ | Ni(S₂C₆H₃CH₃)₂ | 780 |
| 99 | —C₂H₅ | —H | —H | —Br | —H | —H | —H | C₆H₃(CH₃)–N(C₄H₉(i))₂ | Ni(S₂C₆H₃CH₃)₂ | 790 |

TABLE 2-continued

Naphthostyril Dye (structure shown with R-N⁺, substituents A¹, A², A³, B¹, B², B³, and =C-CH=CH-K, Z⁻)

| Example No. | -R | -A¹ | -A² | -A³ | -B¹ | -B² | -B³ | -K | Z⁻ | λ max (coating film) (nm) |
|---|---|---|---|---|---|---|---|---|---|---|
| 100 | -C₂H₅ | -H | -H | -Br | -H | -H | -H | -C₆H₃(CH₃)-N(C₃H₇(n))(C₃H₇(n)) | Ni(S₂C₆H₃CH₃)₂ complex | 785 |
| 101 | -C₂H₅ | -H | -H | -Br | -H | -H | -H | -C₆H₃(CH₃)-N(C₂H₅)(C₄H₉(n)) | Ni(S₂C₆H₃CH₃)₂ complex | 790 |
| 102 | -C₂H₅ | -H | -H | -Br | -H | -H | -H | -C₆H₃(CH₃)-N(C₄H₉(n))(C₂H₄OCH₃) | Ni(S₂C₆H₃CH₃)₂ complex | 780 |
| 103 | -C₂H₅ | -H | -H | -Br | -H | -H | -H | -C₆H₃(CH₃)-N(C₄H₉(n))(C₂H₄OCOCH₃) | Ni(S₂C₆H₃CH₃)₂ complex | 775 |

TABLE 2-continued

Naphthostyril Dye

| Example No. | —R | —A¹ | —A² | —A³ | —B¹ | —B² | —B³ | —K | Z⁻ | λ max (coating film) (nm) |
|---|---|---|---|---|---|---|---|---|---|---|
| 104 | —C₂H₅ | —H | —H | —Br | —H | —H | —H | N(C₄H₉(n))(C₂H₄Cl)-(3-methylphenyl) | Ni(S₂C₆H₃CH₃)₂ | 770 |
| 105 | —C₂H₅ | —H | —H | —Br | —H | —H | —H | N(C₄H₉(n))(C₂H₄OCOCH₃)-(3-methylphenyl) | Ni(S₂C₆H₃CH₃)₂ | 780 |
| 106 | —C₂H₅ | —H | —H | —Br | —H | —H | —H | N(C₄H₉(n))(C₂H₄CO₂C₂H₅)-(3-methylphenyl) | Ni(S₂C₆H₃CH₃)₂ | 780 |
| 107 | —C₂H₅ | —H | —H | —Br | —H | —H | —H | N(C₄H₉(n))(C₂H₄CN)-(3-methylphenyl) | Ni(S₂C₆H₃CH₃)₂ | 760 |

TABLE 2-continued

Naphthostyril Dye

[Structure: naphthostyril dye with substituents R−N⁺=C−CH=CH−K, with positions A¹, A², A³, B¹, B², B³, and counterion Z⁻]

| Example No. | —R | —A¹ | —A² | —A³ | —B¹ | —B² | —B³ | —K | Z⁻ | λ max (coating film) (nm) |
|---|---|---|---|---|---|---|---|---|---|---|
| 108 | —$C_2H_5$ | —H | —H | —Br | —H | —H | —H | N(C₄H₉(n))(C₂H₄OC₂H₄OCH₃) attached to 3-methylphenyl | Ni(S₂C₆H₃CH₃)₂ complex | 780 |
| 109 | —$C_2H_5$ | —H | —H | —Br | —H | —H | —H | N(C₄H₉(n))(C₂H₄O-phenyl) attached to 3-methylphenyl | Ni(S₂C₆H₃CH₃)₂ complex | 775 |
| 110 | —$C_2H_5$ | —H | —H | —Br | —H | —H | —H | N(C₄H₉(n))(C₂H₄-phenyl) attached to 3-methylphenyl | Ni(S₂C₆H₃CH₃)₂ complex | 775 |
| 111 | —$C_2H_5$ | —H | —H | —Br | —H | —H | —H | N(C₄H₉(n))(CH₂-phenyl) attached to 3-methylphenyl | Ni(S₂C₆H₃CH₃)₂ complex | 765 |

TABLE 2-continued
Naphthostyril Dye
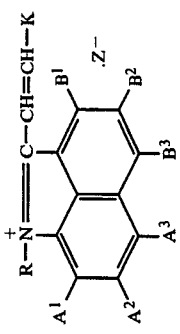
| Example No. | —R | —A¹ | —A² | —A³ | —B¹ | —B² | —B³ | —K | Z⁻ | λ max (coating film) (nm) |
|---|---|---|---|---|---|---|---|---|---|---|
| 112 | —C₂H₅ | —H | —H | —Br | —H | —H | —H | N(C₄H₉(n))(C₂H₄OH)-(3-CH₃-phenyl) | Ni(S₂C₆H₃CH₃)₂ | 780 |
| 113 | —C₂H₅ | —H | —H | —Br | —H | —H | —H | N(C₄H₉(n))(C₂H₄O-4-NO₂-phenyl)-(3-CH₃-phenyl) | Ni(S₂C₆H₃CH₃)₂ | 775 |
| 114 | —C₂H₅ | —H | —H | —Br | —H | —H | —H | N(C₄H₉(n))(CH₂-tetrahydrofuryl)-(3-CH₃-phenyl) | Ni(S₂C₆H₃CH₃)₂ | 780 |
| 115 | —C₂H₅ | —H | —H | —Br | —H | —H | —H | N(C₄H₉(n))(C₂H₄O-4-Cl-phenyl)-(3-CH₃-phenyl) | Ni(S₂C₆H₃CH₃)₂ | 775 |

TABLE 2-continued

Naphthostyril Dye $$\begin{array}{c} \text{R—N}^{+}\text{=C—CH=CH—K} \\ \text{with A}^1, \text{A}^2, \text{A}^3, \text{B}^1, \text{B}^2, \text{B}^3 \text{ substituents} \end{array} \cdot Z^{-}$$

| Example No. | —R | —A$^1$ | —A$^2$ | —A$^3$ | —B$^1$ | —B$^2$ | —B$^3$ | —K | Z$^-$ | λ max (coating film) (nm) |
|---|---|---|---|---|---|---|---|---|---|---|
| 116 | —C$_2$H$_5$ | —H | —H | —Br | —H | —H | —H | 2,4-disubstituted phenyl: OCH$_3$, N(C$_2$H$_5$)$_2$, CH$_3$ | Ni(S$_2$C$_6$H$_3$CH$_3$)$_2$ | 800 |
| 117 | —C$_2$H$_5$ | —H | —H | —Br | —H | —H | —H | phenyl with N(C$_2$H$_5$)$_2$, CH$_3$, NHCOCH$_3$ | Ni(S$_2$C$_6$H$_3$CH$_3$)$_2$ | 820 |
| 118 | —C$_2$H$_5$ | —H | —H | —Br | —H | —H | —H | phenyl with Cl, N(C$_2$H$_5$)$_2$, CH$_3$, NHCOCH$_3$ | Ni(S$_2$C$_6$H$_3$CH$_3$)$_2$ | 800 |
| 119 | —C$_2$H$_5$ | —H | —H | —Br | —H | —H | —H | phenyl with OCH$_3$, N(C$_2$H$_5$)$_2$, CH$_3$, NHCOCH$_3$ | Ni(S$_2$C$_6$H$_3$CH$_3$)$_2$ | 845 |

TABLE 2-continued

Naphthostyril Dye $$\text{structure with } R-N^+, A^1, A^2, A^3, B^1, B^2, B^3, -C-CH=CH-K, Z^-$$

| Example No. | —R | —A¹ | —A² | —A³ | —B¹ | —B² | —B³ | —K | Z⁻ | λ max (coating film) (nm) |
|---|---|---|---|---|---|---|---|---|---|---|
| 120 | —C₂H₅ | —H | —H | —Br | —H | —H | —H | 2-CH₃, 5-OCH₃ phenyl-N(C₂H₅)₂ | Ni(S₂C₂(C₆H₃-CH₃)₂)₂ | 815 |
| 121 | —C₂H₅ | —H | —H | —Br | —H | —H | —H | 3-Cl phenyl-N(C₆H₁₃(n))₂ | Ni(S₂C₂(C₆H₃-CH₃)₂)₂ | 755 |
| 122 | —C₂H₅ | —H | —H | —Br | —H | —H | —H | 4-CH₃ phenyl-N(C₄H₉(n))₂ | Ni(S₂C₂(C₆H₃-CH₃)₂)₂ | 760 |
| 123 | —C₂H₅ | —H | —H | —Br | —H | —H | —H | 3-CH₃ phenyl-N(C₂H₅)(C₂H₄NC₂H₅) | Ni(S₂C₂(C₆H₃-CH₃)₂)₂ | 770 |
| 124 | —C₂H₅ | —H | —H | —Br | —H | —H | —H | 3-CH₃ phenyl-N(C₂H₅)(C₂H₄NH₂) | Ni(S₂C₂(C₆H₃-CH₃)₂)₂ | 755 |

TABLE 2-continued
Naphthostyril Dye
| Example No. | —R | —A¹ | —A² | —A³ | —B¹ | —B² | —B³ | —K | Z⁻ | λ max (coating film) (nm) |
|---|---|---|---|---|---|---|---|---|---|---|
| 125 | —C₂H₅ | —H | —H | —Br | —H | —H | —H | 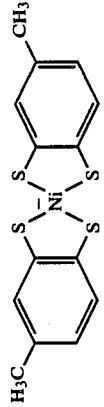 | 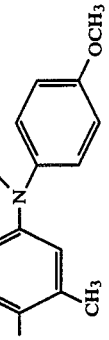 | 775 |
| 126 | —C₂H₅ | —H | —H | —Br | —H | —H | —H | 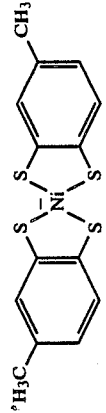 | 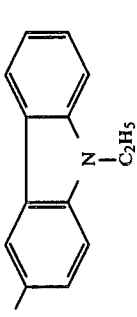 | 770 |
| 127 | —C₂H₅ | —H | —H | —Br | —H | —H | —H | 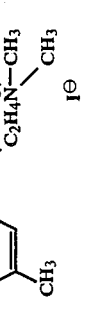 |  | 770 |
| 128 | —C₂H₅ | —H | —H | —Br | —H | —H | —H | 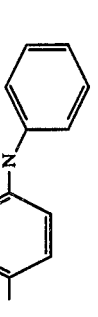 |  | 790 |

TABLE 2-continued

Naphthostyril Dye

[Structure: naphthalene with R-N⁺ group, substituents A¹, A², A³, B¹, B², B³, and C-CH=CH-K group, with Z⁻ counterion]

| Example No. | —R | —A¹ | —A² | —A³ | —B¹ | —B² | —B³ | —K | Z⁻ | λ max (coating film) (nm) |
|---|---|---|---|---|---|---|---|---|---|---|
| 129 | —C₂H₅ | —H | —H | —Br | —H | —H | —H | N(C₄H₉(n))(cyclohexyl)-substituted 3-methylphenyl | Ni(S₂C₂(C₆H₄CH₃)₂)₂ | 780 |
| 130 | —C₂H₅ | —H | —H | —Br | —H | —H | —H | N(C₈H₁₇(n))₂-substituted 3-methylphenyl | Ni complex | 785 |
| 131 | —C₂H₅ | —H | —H | —Br | —H | —H | —H | N(C₃H₇(i))(C₂H₅)-substituted 3-methylphenyl | Ni complex | 785 |
| 132 | —C₂H₅ | —H | —H | —Br | —H | —H | —H | N(C₂H₅)₂-substituted phenyl with NHCOOCH₃ and CH₃ | Ni complex | 800 |

TABLE 2-continued

Naphthostyril Dye structure: R-N⁺=C(-CH=CH-K) fused to naphthalene with A¹, A², A³, B¹, B², B³ substituents; Z⁻ counterion

| Example No. | —R | —A¹ | —A² | —A³ | —B¹ | —B² | —B³ | —K | Z⁻ | λ max (coating film) (nm) |
|---|---|---|---|---|---|---|---|---|---|---|
| 133 | —C₂H₅ | —H | —H | —Br | —H | —H | —H | 4-[N(C₂H₅)₂]-2-(NHSO₂CH₃)-C₆H₃— (with CH₃) | Ni(S₂C₆H₃CH₃)₂ (bis(4-methylbenzene-1,2-dithiolato)nickel) | 795 |
| 134 | —C₃H₇(n) | —H | —H | —Br | —H | —H | —H | 4-[N(C₂H₅)₂]-3-CH₃-C₆H₃— | Ni(S₂C₆H₄)₂ | 780 |
| 135 | —C₅H₁₁(n) | —H | —H | —Br | —H | —H | —H | 4-[N(C₂H₅)₂]-3-CH₃-C₆H₃— | Ni(S₂C₆H₂Cl₂)₂ | 780 |
| 136 | —CH₂C₆H₅ | —H | —H | —Br | —H | —H | —H | 4-[N(C₂H₅)₂]-3-CH₃-C₆H₃— | Ni(S₂C₆H₃Cl)₂ | 780 |

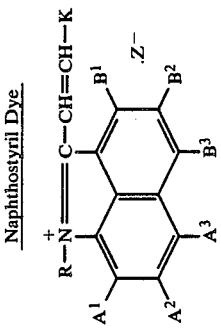

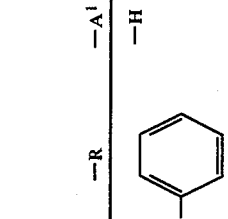

TABLE 2-continued

Naphthostyril Dye

| Example No. | —R | —A¹ | —A² | —A³ | —B¹ | —B² | —B³ | —K | Z⁻ | λ max (coating film) (nm) |
|---|---|---|---|---|---|---|---|---|---|---|
| 141 | —C₂H₄O–C₆H₅ | —H | —H | —Br | —H | —H | —H | 3-CH₃-4-N(C₂H₅)₂-C₆H₃ | Ni(S₂C₂(C₆H₄-N(C₂H₅)₂)₂)₂ | 790 |
| 142 | —C₂H₄OC₂H₄OCH₃ | —H | —H | —Br | —H | —H | —H | 3-CH₃-4-N(C₂H₅)₂-C₆H₃ | Ni(S₂C₂(C₆H₄)₂)₂ | 790 |
| 143 | —C₂H₄(OC₂H₄)₂OCH₃ | —H | —H | —Br | —H | —H | —H | 3-CH₃-4-N(C₂H₅)₂-C₆H₃ | Ni(S₂C₂(CH₃-C₆H₃)₂)₂ | 790 |
| 144 | —C₂H₄OCH₂CH=CH₂ | —H | —H | —Br | —H | —H | —H | 3-CH₃-4-N(C₂H₅)₂-C₆H₃ | Ni(naphtho-oxathiolene)₂ | 785 |

TABLE 2-continued

Naphthostyril Dye

| Example No. | —R | —A¹ | —A² | —A³ | —B¹ | —B² | —B³ | —K | Z⁻ | λ max (coating film) (nm) |
|---|---|---|---|---|---|---|---|---|---|---|
| 145 | —CH₂CH=CH₂ | —H | —H | —Br | —H | —H | —H | 3-methyl-4-(N,N-diethylamino)phenyl | Ni(S₂C₂Ph₂)₂ | 785 |
| 146 | cyclohexyl | —H | —H | —Br | —H | —H | —H | 3-methyl-4-(N,N-diethylamino)phenyl | Ni[S₂C₂(C₆H₄-NEt₂)(C₆H₅)]₂ | 790 |
| 147 | —C₂H₄OCH₂CH=CH₂ | —H | —H | —Br | —H | —H | —H | 3-methyl-4-(N,N-diethylamino)phenyl | Ni(S₂C₆H₃-CH₃)₂ | 780 |

TABLE 2-continued

Naphthostyril Dye

| Example No. | —R | —A¹ | —A² | —A³ | —B¹ | —B² | —B³ | —K | Z⁻ | λ max (coating film) (nm) |
|---|---|---|---|---|---|---|---|---|---|---|
| 148 | —C₂H₄OH | —H | —H | —Br | —H | —H | —H | N,N-diethyl-3-methylaniline group | Ni(dithiolene) complex with 4-methylphenyl groups | 780 |
| 149 | —C₂H₄Cl | —H | —H | —Br | —H | —H | —H | N,N-diethyl-3-methylaniline group | Ni(dithiolene) complex with 4-methylphenyl groups | 785 |
| 150 | —CH₂-(tetrahydrofuran-2-yl) | —H | —H | —Br | —H | —H | —H | N,N-diethyl-3-methylaniline group | Ni(dithiolene) complex with 4-methylphenyl groups | 770 |
| 151 | —C₂H₄CN | —H | —H | —Br | —H | —H | —H | N,N-diethyl-3-methylaniline group | Ni(dithiolene) complex with 4-methylphenyl groups | 775 |

TABLE 2-continued

Naphthostyril Dye

| Example No. | —R | —A¹ | —A² | —A³ | —B¹ | —B² | —B³ | —K | Z⁻ | λ max (coating film) (nm) |
|---|---|---|---|---|---|---|---|---|---|---|
| 152 | —C₂H₄CN | —H | —H | —H | —H | —H | —H | N(C₂H₅)₂, 3-CH₃-phenyl | Ni(tolyl-dithiolene)₂ | 780 |
| 153 | —C₂H₄CN | —H | —H | —N(CH₃)₂ | —H | —H | —H | N(C₂H₅)₂, 3-CH₃-phenyl | Ni(tolyl-dithiolene)₂ | 820 |
| 154 | —C₂H₄CN | —H | —H | —H | —H | —H | —H | N(C₄H₉(n))₂, 3-CH₃-phenyl | Ni(tolyl-dithiolene)₂ | 760 |
| 155 | —C₂H₄CN | —H | —H | —H | —H | —H | —H | N(C₅H₁₁(n))₂, 3-CH₃-phenyl | Ni(tolyl-dithiolene)₂ | 785 |
| 156 | —C₂H₅ | —H | —H | —N(CH₃)₂ | —H | —H | —H | N(C₂H₅)₂, 4-CH₃-phenyl | Ni(tolyl-dithiolene)₂ | 780 |

TABLE 2-continued

Naphthostyril Dye

| Example No. | —R | —A¹ | —A² | —A³ | —B¹ | —B² | —B³ | —K | Z⁻ | λ max (coating film) (nm) |
|---|---|---|---|---|---|---|---|---|---|---|
| 157 | —C$_2$H$_5$ | —H | —H | —Cl | —H | —H | —H | N(C$_2$H$_5$)$_2$, 3-CH$_3$-phenyl | Ni(S$_2$C$_6$H$_3$CH$_3$)$_2$ | 770 |
| 158 | —C$_2$H$_5$ | —Br | —H | —Br | —H | —H | —H | N(C$_2$H$_5$)$_2$, 3-CH$_3$-phenyl | Ni(S$_2$C$_6$H$_3$CH$_3$)$_2$ | 775 |
| 159 | —C$_2$H$_5$ | —H | —H | —OCH$_3$ | —H | —H | —H | N(C$_2$H$_5$)$_2$, 3-CH$_3$-phenyl | Ni(S$_2$C$_6$H$_3$CH$_3$)$_2$ | 790 |
| 160 | —C$_2$H$_5$ | —H | —H | —NHCH$_3$ | —H | —H | —H | N(C$_2$H$_5$)$_2$, 3-CH$_3$-phenyl | Ni(S$_2$C$_6$H$_3$CH$_3$)$_2$ | 795 |

TABLE 2-continued

Naphthostyril Dye

| Example No. | —R | —A¹ | —A² | —A³ | —B¹ | —B² | —B³ | —K | Z⁻ | λ max (coating film) (nm) |
|---|---|---|---|---|---|---|---|---|---|---|
| 161 | —C₂H₅ | —H | —H | —Br | —H | —H | —H | (2-methyl-4-(1,1,3-trimethyl...)phenyl)-N-ethyl group | Ni(S₂C₆H₃-CH₃)₂ | 790 |
| 162 | —C₂H₅ | —H | —H | —Br | —H | —H | —H | (5-methyl-2-(1,1,3-trimethyl...)phenyl)-N-ethyl group | Ni(S₂C₆H₃-CH₃)₂ | 810 |
| 163 | —C₂H₅ | —H | —H | —Br | —H | —H | —H | morpholino/allyloxyethyl-N group | Ni(S₂C₆H₃-CH₃)₂ | 800 |
| 164 | —C₂H₅ | —H | —H | —Br | —H | —H | —H | 5-methyl-8-(n-butylamino)quinoline group | Ni(S₂C₆H₃-CH₃)₂ | 815 |

TABLE 2-continued
Naphthostyril Dye
| Example No. | —R | —A¹ | —A² | —A³ | —B¹ | —B² | —B³ | —K | Z⁻ | λ max (coating film) (nm) |
|---|---|---|---|---|---|---|---|---|---|---|
| 165 | —C₂H₅ | —H | —H | —Br | —H | —H | —H | 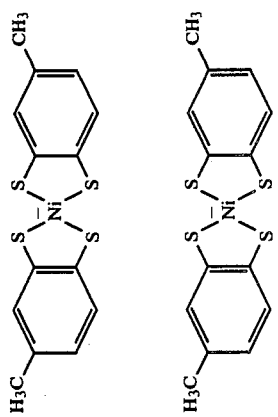 | 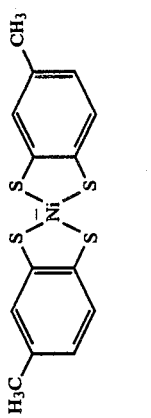 | 810 |
| 166 | —C₂H₅ | —H | —H | —Br | —H | —H | —H | 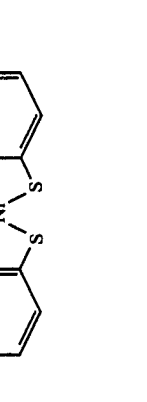 | (Ni complex as above) | 800 |
| 167 | —C₂H₅ | —H | —H | —Br | —H | —H | —H | 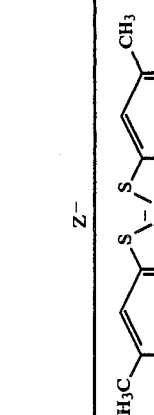 | (Ni complex as above) | 790 |
| 168 | —C₂H₅ | —H | —H | —Br | —H | —H | —H | (structure) | (Ni complex as above) | 790 |

TABLE 2-continued

Naphthostyril Dye

[Structure: naphthostyril core with R—N⁺=C—CH=CH—K, substituents A¹, A², A³, B¹, B², B³, and Z⁻ counterion]

| Example No. | —R | —A¹ | —A² | —A³ | —B¹ | —B² | —B³ | —K | Z⁻ | λ max (coating film) (nm) |
|---|---|---|---|---|---|---|---|---|---|---|
| 169 | —C₂H₅ | —H | —H | —Br | —H | —H | —H | [4-methyl-2-(N-(2-methoxyethyl)-N-(2-methyl-2-methylpropyl))aminophenyl group with CH₃, CH₃, CH₃, C₂H₄OCH₃ substituents] | Ni(dithiolene) complex with two 4-methylphenyl groups | 805 |
| 170 | —C₂H₅ | —H | —H | —OH | —H | —H | —H | [6-methyl-1-ethyl-1,2,3,4-tetrahydroquinolin-8-yl] with C₂H₅ on N | Ni(dithiolene) complex with two 4-methylphenyl groups | 795 |
| 171 | —C₂H₅ | —H | —H | —NH₂ | —H | —H | —H | [5-methylquinolin-8-yl with NHC₂H₄OH] | Ni(dithiolene) complex with two 4-methylphenyl groups | 810 |
| 172 | —C₂H₅ | —H | —H | —NHC₂H₅ | —H | —H | —H | [4-methylnaphthalen-1-yl with NHC₂H₄OC₂H₄OH] | Ni(dithiolene) complex with two 4-methylphenyl groups | 805 |

TABLE 2-continued
Naphthostyril Dye
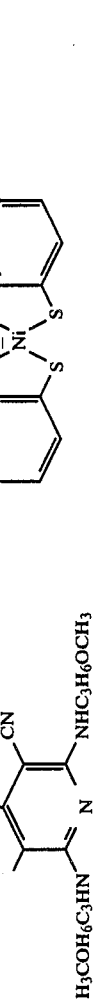
| Example No. | —R | —A¹ | —A² | —A³ | —B¹ | —B² | —B³ | —K | Z⁻ | λ max (coating film) (nm) |
|---|---|---|---|---|---|---|---|---|---|---|
| 173 | —C₂H₅ | —H | —H | —NHCOCH₃ | —H | —H | —H | 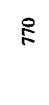 | 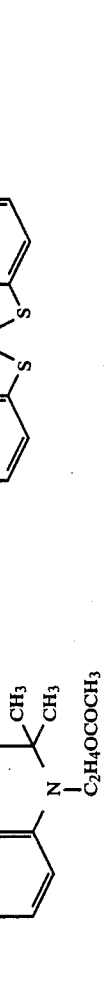 | 800 |
| 174 | —C₂H₅ | —H | —H |  | —H | —H | —H | 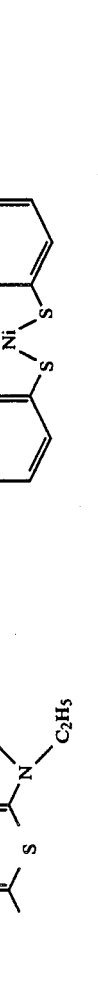 | 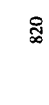 | 770 |
| 175 | —C₂H₅ | —H | —H | —Br | —H | —H | —H |  | 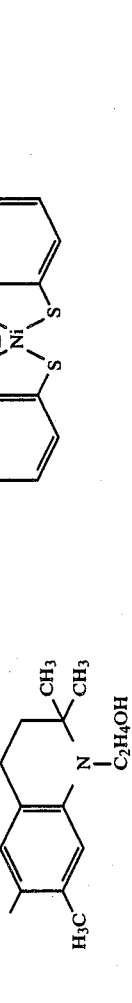 | 780 |
| 176 | —C₂H₅ | —Br | —H | —Br | —H | —H | —H |  |  | 820 |

TABLE 2-continued

Naphthostyryl Dye $$R-\overset{+}{N}=C-CH=CH-K \quad Z^-$$

with naphthalene bearing $A^1, A^2, A^3, B^1, B^2, B^3$ substituents

| Example No. | —R | —$A^1$ | —$A^2$ | —$A^3$ | —$B^1$ | —$B^2$ | —$B^3$ | —K | $Z^-$ | λ max (coating film) (nm) |
|---|---|---|---|---|---|---|---|---|---|---|
| 177 | —$C_2H_5$ | —Br | —H | —Br | —H | —H | —H | 8-methyl-1,2,3,4-tetrahydroquinoline with N—$C_2H_4OH$ | Ni(S-C6H3-CH3)2 complex | 770 |
| 178 | —$C_2H_5$ | —Br | —H | —Br | —Br | —H | —Br | 5-methylquinolin-8-yl with NH$C_2H_4OCH_3$ | Ni(S-C6H3-CH3)2 complex | 800 |
| 179 | —$C_2H_5$ | —Br | —H | —$CH_3$ | —Br | —H | —Br | 4-methylnaphthalen-1-yl with NH$C_2H_4OCH_3$ | Ni(S-C6H3-CH3)2 complex | 805 |
| 180 | —$C_2H_5$ | —Br | —H | —$C_2H_5$ | —Br | —H | —$C_2H_5$ | pyridine with CN, $CH_3$, NH$C_6H_5$, NH$C_2H_4OCH_3$ substituents | Ni(S-C6H3-CH3)2 complex | 790 |

TABLE 2-continued

Naphthostyril Dye

| Example No. | —R | —A¹ | —A² | —A³ | —B¹ | —B² | —B³ | —K | Z⁻ | λ max (coating film) (nm) |
|---|---|---|---|---|---|---|---|---|---|---|
| 181 | —$C_2H_5$ | —H | —H | —H | —H | —H | —H | N(C₂H₅)₂-substituted methylthiophene | Ni(dithiolene) bis(4-methylphenyl) complex | 780 |
| 182 | —$C_2H_5$ | —Br | —H | —SCN | —H | —H | —H | N(C₄H₉(n))₂-substituted 3-methylphenyl | Ni(dithiolene) bis(4-methylphenyl) complex | 790 |
| 183 | —$C_3H_7(n)$ | —Br | —H | —SCN | —H | —H | —H | N(C₄H₉(n))₂-substituted 3-methylphenyl | Ni(dithiolene) bis(4-methylphenyl) complex | 790 |
| 184 | —$C_4H_9(n)$ | —Br | —H | —SCN | —H | —H | —H | N(C₄H₉(n))₂-substituted 3-methylphenyl | Ni(dithiolene) bis(4-methylphenyl) complex | 790 |

EXAMPLE 185

To a mixture of 250 g of glacial acetic acid and 50 g of acetic anhydride were added 40.2 g of a compound of formula:

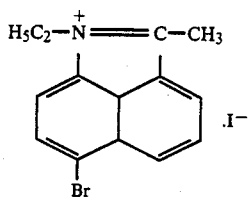

and 17.5 g of a compound of formula:

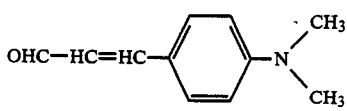

and the mixture was heated at 100° to 105° C. for 4 hours while stirring. After completion of the reaction, the reaction mixture was cooled to room temperature. The reaction mixture was then poured into 1.5 liters of water containing 16.0 g of sodium perchlorate, and the mixture was stirred at room temperature for 8 hours. The thus precipitated crystals were collected by filtration and dried to obtain 53.0 g of a naphthostyril dye of the formula shown below as dark green crystals. A chloroform solution of the dye had a $\lambda_{max}$ of 800 nm.

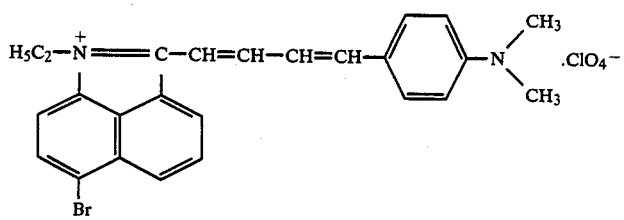

One gram of the naphthostyril dye as above obtained was dissolved in 50 g of dibromoethane, followed by filtration through a filter of 0.22 μm. The resulting solution (2 ml) was coated on a substrate of grooved PMMA disc in the same manner as in Example 2 to form a coating film having a thickness of 700 Å. The coated film had a $\lambda_{max}$ of 820 nm with a broad peak width.

When a semiconductor laser beam having a center wavelength of 830 nm and a beam diameter of 1 μm was irradiated on the coated film at an output of 6 mW, clearly outlined pits having a width of about 1 μm and a pit length of about 2 μm were formed. The C/N ratio of the pits was 52 dB. The coated film exhibited satisfactory light resistance and resistance to reproducing light.

EXAMPLE 186

In the same manner as described in Example 185, a naphthostyril dye of the formula shown below was synthesized. A chloroform solution of the dye had a $\lambda_{max}$ of 795 nm.

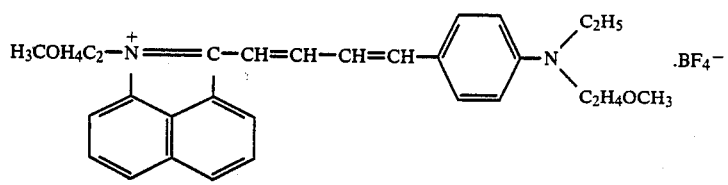

One gram of the naphthostyril dye as above prepared and 1.5 g of nitrocellulose ("RS-20" produced by Daicel Chemical Industries, Ltd.) were dissolved in 50 g of ethyl cellosolve, and the solution was filtered through a filter of 0.22 μm. 3 ml of the resulting solution was dropped on a substrate of polycarbonate resin disc having a diameter of 120 mm which had been grooved to a depth of 650 Å and a width of 0.7 μm and coated by a spinner at 1,500 rpm, followed by drying at 60° C. for 10 minutes. The coated film has a thickness of 700 Å as measured in the same manner as in Example 1. The coated film exhibited maximum absorption at 810 nm of wavelength with a broad peak width.

When a semiconductor laser beam having a center wavelength of 830 nm and a beam diameter of 1 μm was irradiated on the coated film at an output of 6 mW, clearly outlined pits having a width of about 1 μm and a pit length of about 2 μm were formed. The thus formed recording layer had a C/N ratio of 51 dB and exhibited satisfactory light resistance and resistance to reproducing light.

EXAMPLE 187

A naphthostyril dye of the formula shown below was synthesized in the same manner as in Example 3. A chloroform solution of the dye had a $\lambda_{max}$ of 800 nm.

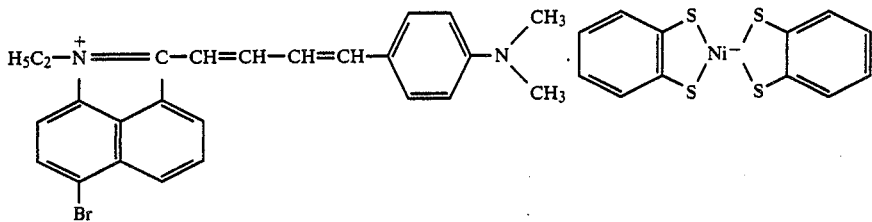

One gram of the naphtholactam dye as above prepared was dissolved in 50 g of dibromoethane, followed by filtration through a filter of 0.22 μm. 2 ml of the resulting solution was dropped on a substrate of PMMA disc having a diameter of 120 mm which had been grooved to a depth of 700 Å and a width of 0.7 μm and coated by a spinner at 650 rpm, followed by drying at 60° C. for 10 minutes. The film thickness was 800 Å as measured in the same manner as in Example 1. The coated film had a $\lambda_{max}$ of 820 nm with a broad peak width.

When a semiconductor laser beam having a center wavelength of 830 nm and a beam diameter of 1 μm was irradiated on the coated film at an output of 6 mW, clearly outlined pits having a width of about 1 μm and a pit length of about 2 μm were formed. The recording layer thus formed had a C/N ratio of 51 dB and exhibited satisfactory light resistance and resistance to reproducing light.

EXAMPLES 188 TO 278

In the same manner as in Example 185, naphthostyril dyes shown in Table 3 were synthesized. The wavelength of the absorption maximum of each of the resulting dyes in its chloroform solution was as shown in Table 3.

Each of the dyes was coated on a substrate of grooved PMMA disc in the same manner as in Example 185 to form a recording layer. When a semiconductor laser beam having a center wavelength of 830 nm was irradiated on the recording layer, clearly outlined pits were formed. The recording layer had a high reflectance, high sensitivity, and an excellent C/N ratio and exhibited satisfactory light resistance and resistance to reproduced light.

TABLE 3
Naphtholactam Dye
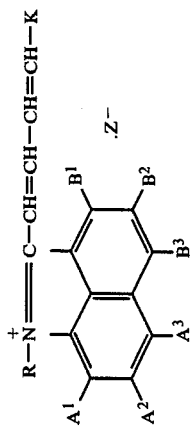
| Example No. | —R | —A¹ | —A² | —A³ | —B¹ | —B² | —B³ | —K | Z⁻ | λ max (in CHCl₃) (nm) |
|---|---|---|---|---|---|---|---|---|---|---|
| 188 | —C₂H₅ | —H | —H | —Br | —H | —H | —H | N(C₂H₅)(C₂H₅)-p-tolyl | ClO₄⁻ | 805 |
| 189 | " | " | " | " | " | " | " | N(C₄H₉(n))(C₄H₉(n))-p-tolyl | " | 810 |
| 190 | " | " | " | " | " | " | " | N(C₃H₇(n))(C₃H₇(n))-p-tolyl | " | 807 |
| 191 | " | " | " | " | " | " | " | N(C₂H₅)(C₄H₉(n))-p-tolyl | " | 807 |
| 192 | " | " | " | " | " | " | " | N(C₄H₉(n))(C₂H₄OCH₃)-p-tolyl | " | 800 |
| 193 | " | " | " | " | " | " | " | N(C₄H₉(n))(C₂H₄OCCH₃=O)-p-tolyl | " | 800 |

TABLE 3-continued

Naphtholactam Dye

Structure:

$R-\overset{+}{N}=C-CH=CH-CH=CH-K$ with naphthalene bearing $A^1, A^2, A^3, B^1, B^2, B^3$ and $Z^-$ counterion.

| Example No. | −R | −A¹ | −A² | −A³ | −B¹ | −B² | −B³ | −K | Z⁻ | λ max (in CHCl₃) (nm) |
|---|---|---|---|---|---|---|---|---|---|---|
| 194 | " | " | " | " | " | " | " | p-tolyl–N(C₄H₉(n))(C₂H₄Cl) | " | 790 |
| 195 | " | " | " | " | " | " | " | p-tolyl–N(C₄H₉(n))(C₂H₄OCOCH₃) | " | 800 |
| 196 | " | " | " | " | " | " | " | p-tolyl–N(C₄H₉(n))(C₂H₄COC₂H₅) | " | 800 |
| 197 | " | " | " | " | " | " | " | p-tolyl–N(C₄H₉(n))(C₂H₄CN) | " | 785 |
| 198 | " | " | " | " | " | " | " | p-tolyl–N(C₄H₉(n))(C₂H₄OC₂H₄OCH₃) | " | 800 |

TABLE 3-continued
Naphtholactam Dye
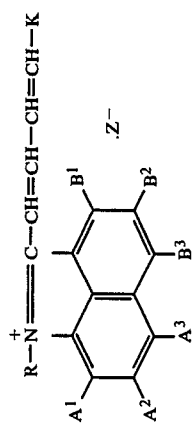
| Example No. | —R | —A¹ | —A² | —A³ | —B¹ | —B² | —B³ | —K | Z⁻ | λ max (in CHCl₃) (nm) |
|---|---|---|---|---|---|---|---|---|---|---|
| 199 | —R | " | " | " | " | " | " | N(C₄H₉(n))(C₂H₄O-C₆H₅) with p-tolyl | " | 800 |
| 200 | " | " | " | " | " | " | " | N(C₄H₉(n))(C₂H₄-C₆H₅) with p-tolyl | " | 810 |
| 201 | " | " | " | " | " | " | " | N(C₄H₉(n))(CH₂-C₆H₅) with p-tolyl | " | 790 |
| 202 | " | " | " | " | " | " | " | N(C₄H₉(n))(C₂H₄OH) with p-tolyl | " | 800 |
| 203 | " | " | " | " | " | " | " | N(C₄H₉(n))(C₂H₄O-C₆H₄-NO₂) with p-tolyl | " | 800 |

TABLE 3-continued
Naphtholactam Dye
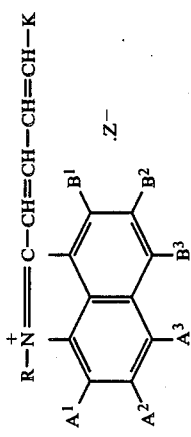
| Example No. | —R | —A¹ | —A² | —A³ | —B¹ | —B² | —B³ | —K | Z⁻ | λ max (in CHCl₃) (nm) |
|---|---|---|---|---|---|---|---|---|---|---|
| 204 | " | " | " | " | " | " | " | N(C₄H₉(n))(CH₂-tetrahydrofuranyl)-phenyl (p-CH₃) | " | 800 |
| 205 | " | " | " | " | " | " | " | N(C₄H₉(n))(C₂H₄O-C₆H₄Cl)-phenyl (p-CH₃) | " | 800 |
| 206 | " | " | " | " | " | " | " | N(C₂H₅)₂-(3-CH₃-phenyl) | " | 820 |
| 207 | " | " | " | " | " | " | " | N(CH₃)(C₂H₅)-(3-CH₃-phenyl) | " | 820 |
| 208 | " | " | " | " | " | " | " | N(C₄H₉(n))₂-(3-CH₃-phenyl) | " | 825 |

TABLE 3-continued
Naphtholactam Dye
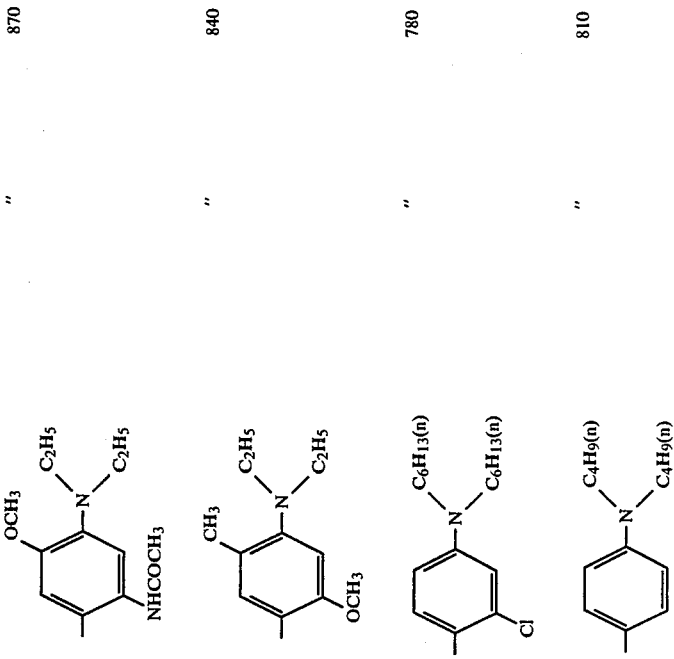
| Example No. | —R | —A¹ | —A² | —A³ | —B¹ | —B² | —B³ | —K | Z⁻ | λ max (in CHCl₃) (nm) |
|---|---|---|---|---|---|---|---|---|---|---|
| 209 | " | " | " | " | " | " | " | 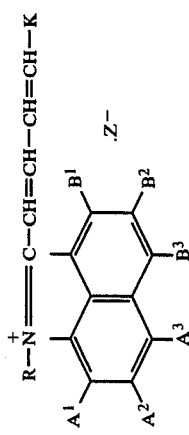 | " | 870 |
| 210 | " | " | " | " | " | " | " | (4-OCH₃, 2-CH₃, 5-N(C₂H₅)₂ substituted phenyl variant shown) | " | 840 |
| 211 | " | " | " | " | " | " | " | (3-Cl, 4-CH₃, N(C₆H₁₃(n))₂ phenyl) | " | 780 |
| 212 | " | " | " | " | " | " | " | (4-CH₃, N(C₄H₉(n))₂ phenyl) | " | 810 |

TABLE 3-continued
Naphtholactam Dye
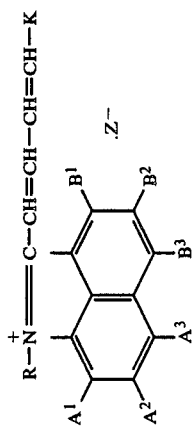
| Example No. | —R | —A$^1$ | —A$^2$ | —A$^3$ | —B$^1$ | —B$^2$ | —B$^3$ | —K | Z$^-$ | λ max (in CHCl$_3$) (nm) |
|---|---|---|---|---|---|---|---|---|---|---|
| 213 | —R | " | " | " | " | " | " | ![N(C2H5)(C6H4-CH3) linked to C6H4-N(C2H5)(C2H4NH-C2H5)] | Z$^-$ | 800 |
| 214 | " | " | " | " | " | " | " | ![N(C2H5)(C6H4-CH3) linked to C6H4-C2H4NH2(C2H5)] | I$^-$ | 800 |
| 215 | " | " | " | " | " | " | " | ![N(C2H5)(C6H4-CH3) linked to C6H4-C2H4N⊕(CH3)3] I$^⊖$ | " | 795 |
| 216 | " | " | " | " | " | " | " | ![N(C2H5)(C6H4-CH3)(C6H5)] | Br$^-$ | 810 |
| 217 | " | " | " | " | " | " | " | ![N(C2H5)(C6H4-CH3)(C6H4-OCH3)] | " | 810 |

TABLE 3-continued
Naphtholactam Dye
$$R-\overset{+}{N}=C-CH=CH-CH=CH-K \quad Z^-$$
(with naphtholactam ring bearing substituents $A^1, A^2, A^3, B^1, B^2, B^3$)
| Example No. | —R | —A¹ | —A² | —A³ | —B¹ | —B² | —B³ | —K | Z⁻ | λ max (in CHCl₃) (nm) |
|---|---|---|---|---|---|---|---|---|---|---|
| 218 | " | " | " | " | " | " | " | 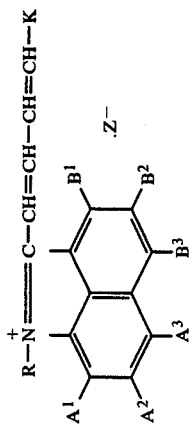 | " | 830 |
| 219 | " | " | " | " | " | " | " | 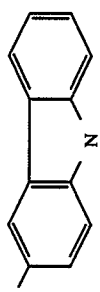 | " | 820 |
| 220 | " | " | " | " | " | " | " | 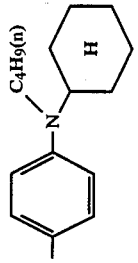 | " | 815 |
| 221 | " | " | " | " | " | " | " | 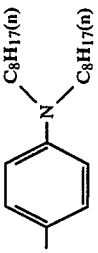 | " | 806 |
| 222 | " | " | " | " | " | " | " | 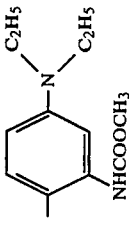 | " | 840 |

TABLE 3-continued
Naphtholactam Dye
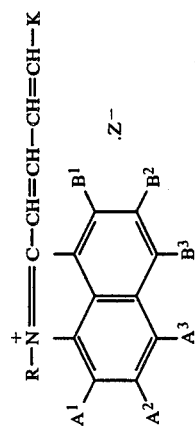
| Example No. | —R | —A¹ | —A² | —A³ | —B¹ | —B² | —B³ | —K | Z⁻ | λ max (in CHCl₃) (nm) |
|---|---|---|---|---|---|---|---|---|---|---|
| 223 | " | | | | | | | 3-(N,N-diethylamino)-4-methyl-NHSO₂CH₃ phenyl | BF₄⁻ | 835 |
| 224 | —C₃H₇(n) | " | " | " | " | " | " | 4-(N,N-diethylamino)phenyl | " | 805 |
| 225 | —C₅H₁₁(n) | " | " | " | " | " | " | " | " | 805 |
| 226 | —CH₂–C₆H₅ | " | " | " | " | " | " | " | " | 805 |
| 227 | —C₆H₅ | " | " | " | " | " | " | " | " | 805 |
| 228 | —C₂H₄OCH₃ | " | " | " | " | " | " | " | " | 805 |
| 229 | —CH₂CH₂CH₂OCH₃ | " | " | " | " | " | " | " | " | 805 |
| 230 | —C₃H₇—C₆H₅ | " | " | " | " | " | " | " | 4-CH₃-C₆H₄-SO₃⁻ | 805 |

TABLE 3-continued

Naphtholactam Dye $$R-\overset{+}{N}=C-CH=CH-CH=CH-K \quad Z^-$$

(with naphthalene ring bearing $A^1, A^2, A^3, B^1, B^2, B^3$ substituents)

| Example No. | —R | —$A^1$ | —$A^2$ | —$A^3$ | —$B^1$ | —$B^2$ | —$B^3$ | —K | $Z^-$ | λ max (in CHCl₃) (nm) |
|---|---|---|---|---|---|---|---|---|---|---|
| 231 | —C₂H₄O—Ph | " | " | " | " | " | " | " | " | 805 |
| 232 | —C₂H₄OC₂H₄OCH₃ | " | " | " | " | " | " | " | " | 805 |
| 233 | —C₂H₄OC₂H₄OC₂H₄OCH₃ | " | " | " | " | " | " | " | " | 805 |
| 234 | —C₂H₄OCH₂CH=CH₂ | " | " | " | " | " | " | " | " | 805 |
| 235 | —CH₂CH=CH₂ | " | " | " | " | " | " | " | " | 805 |
| 236 | —cyclohexyl | " | " | " | " | " | " | " | " | 805 |
| 237 | —C₂H₄OCH₂CH=CH₂ | " | " | " | " | " | " | " | ClO₄⁻ | 805 |
| 238 | —C₂H₄OH | " | " | " | " | " | " | " | " | 805 |
| 239 | —C₂H₄Cl | " | " | " | " | " | " | " | SCN⁻ | 810 |
| 240 | —CH₂-(tetrahydrofuranyl) | " | " | " | " | " | " | " | " | 805 |
| 241 | —C₂H₄CN | " | " | —H | " | " | " | " | " | 810 |
| 242 | " | " | " | —H | " | " | " | " | " | 800 |
| 243 | —C₂H₄CN | " | " | —N(CH₃)₂ | " | " | " | " | " | 820 |

TABLE 3-continued
Naphtholactam Dye
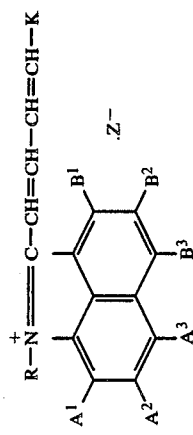
| Example No. | —R | —A$^1$ | —A$^2$ | —A$^3$ | —B$^1$ | —B$^2$ | —B$^3$ | —K | Z$^-$ | λ max (in CHCl$_3$) (nm) |
|---|---|---|---|---|---|---|---|---|---|---|
| 244 | " | " | " | —H | " | " | " | 4-(N(C$_4$H$_9$(n))$_2$)C$_6$H$_4$— | ClO$_4^-$ | 810 |
| 245 | " | " | " | " | " | " | " | 4-(N(C$_5$H$_{11}$(n))$_2$)C$_6$H$_4$— | " | 810 |
| 246 | —H | " | " | " | " | " | " | 4-(N(CH$_3$)$_2$)C$_6$H$_4$— | 4-CH$_3$-C$_6$H$_4$-SO$_3^-$ | 800 |
| 247 | —C$_2$H$_5$ | " | " | —N(CH$_3$)$_2$ | " | " | " | 4-(N(C$_2$H$_5$)$_2$)C$_6$H$_4$— | " | 820 |
| 248 | " | " | " | —Cl | " | " | " | " | C$_6$H$_5$-SO$_3^-$ | 805 |

TABLE 3-continued
Naphtholactam Dye
R—N⁺=C—CH=CH—CH=CH—K
with A¹, A², A³ on one ring and B¹, B², B³ on the other ring; Z⁻
| Example No. | —R | —A¹ | —A² | —A³ | —B¹ | —B² | —B³ | —K | Z⁻ | λ max (in CHCl₃) (nm) |
|---|---|---|---|---|---|---|---|---|---|---|
| 249 | " | —Br | " | —Br | " | " | " | " | 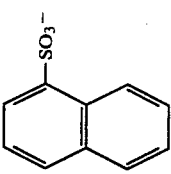 | 810 |
| 250 | " | —H | " | —OCH₃ | " | " | " | " | " | 815 |
| 251 | " | " | " | —NHCH₃ | " | " | " | " | " | 820 |
| 252 | " | " | " | —Br | " | " | " | " | ClO₄⁻ | 840 |
| 253 | " | " | " | " | " | " | " | 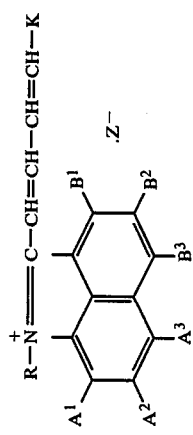 | " | 860 |

TABLE 3-continued
Naphtholactam Dye
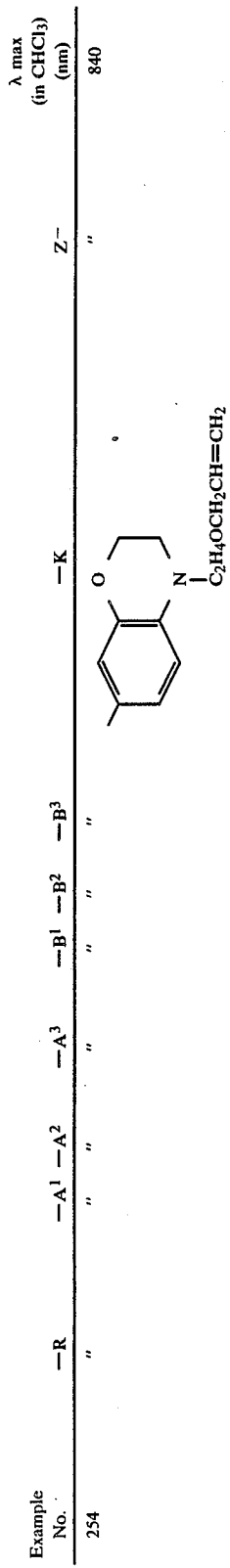
| Example No. | —R | —A$^1$ | —A$^2$ | —A$^3$ | —B$^1$ | —B$^2$ | —B$^3$ | —K | Z$^-$ | λ max (in CHCl$_3$) (nm) |
|---|---|---|---|---|---|---|---|---|---|---|
| 254 | " | " | " | " | " | " | " | 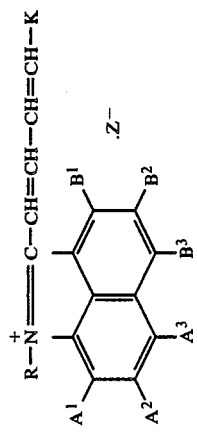 | " | 840 |
| 255 | " | " | " | " | " | " | " | 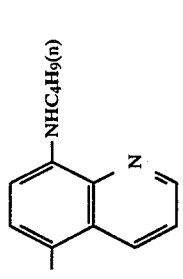 | " | 860 |
| 256 | " | " | " | " | " | " | " | 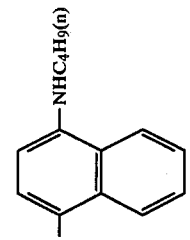 | " | 860 |
| 257 | " | " | " | " | " | " | " | 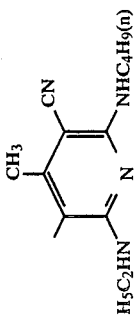 | " | 850 |

TABLE 3-continued

Naphtholactam Dye

[Structure: R—N⁺=C—CH=CH—CH=CH—K with naphthalene ring bearing A¹, A², A³, B¹, B², B³ substituents; Z⁻ counterion]

| Example No. | —R | —A¹ | —A² | —A³ | —B¹ | —B² | —B³ | —K | Z⁻ | λ max (in CHCl₃) (nm) |
|---|---|---|---|---|---|---|---|---|---|---|
| 258 | | | | | | | | ![K group: N(C₄H₉(n))(CH₂CH=CH₂)-phenyl-CH₃] | " | 800 |
| 259 | " | " | " | " | " | " | " | ![K group: dihydroquinoline with CH₃ groups and N-C₂H₄OCH₃] | " | 835 |
| 260 | " | " | " | " | " | " | " | ![K group: dihydroquinoline with CH₃ groups, H₃C substituent, and N-C₂H₄OCH₃] | " | 855 |
| 261 | " | " | —OH | " | " | " | " | ![K group: tetrahydroquinoline with CH₃ substituent and N-C₂H₅] | " | 835 |

TABLE 3-continued

Naphtholactam Dye $$R-\overset{+}{N}=C-CH=CH-CH=CH-K$$

with naphthalene ring bearing $A^1, A^2, A^3, B^1, B^2, B^3$ substituents; $Z^-$ counterion.

| Example No. | —R | —A$^1$ | —A$^2$ | —A$^3$ | —B$^1$ | —B$^2$ | —B$^3$ | —K | Z$^-$ | λ max (in CHCl$_3$) (nm) |
|---|---|---|---|---|---|---|---|---|---|---|
| 262 | —R | " | " | —NH$_2$ | " | " | " | 8-NHC$_2$H$_4$OH-5-methylquinolinyl | " | 860 |
| 263 | " | " | " | —NHC$_2$H$_5$ | " | " | " | 4-NHC$_2$H$_4$OC$_2$H$_4$OH-5-methylnaphthyl | " | 865 |
| 264 | " | " | " | —NHCOCH$_3$ | " | " | " | pyridinyl (CH$_3$, CN, NHC$_3$H$_6$OCH$_3$, NHC$_3$H$_6$OCH$_3$ substituents) | " | 835 |
| 265 | " | " | " | —N(COCH$_3$)$_2$ | " | " | " | thiazolyl-N(C$_2$H$_5$)$_2$ | " | 820 |

TABLE 3-continued

Naphtholactam Dye $$R-\overset{+}{N}=C-CH=CH-CH=CH-K \quad Z^-$$

(with naphthalene bearing $A^1, A^2, A^3, B^1, B^2, B^3$ substituents)

| Example No. | —R | —A¹ | —A² | —A³ | —B¹ | —B² | —B³ | —K | Z⁻ | λ max (in CHCl₃) (nm) |
|---|---|---|---|---|---|---|---|---|---|---|
| 266 | " | " | " | —Br | " | " | " | ![K group: 2,4-dimethyl-N-(C₂H₄OCOCH₃)-aniline with CH(CH₃)C(CH₃)₂ linker] | " | 830 |
| 267 | " | —Br | " | " | " | " | " | ![K group: dimethylaniline with CH(CH₃)C(CH₃)₂ and C₂H₄OH] | " | 860 |
| 268 | " | " | " | " | —Br | " | " | ![K group: tetrahydroquinoline with C₂H₄OH] | " | 830 |
| 269 | " | " | " | " | " | " | —Br | ![K group: NHC₂H₄OCH₃ on methylquinoline] | " | 855 |

TABLE 3-continued

Naphtholactam Dye

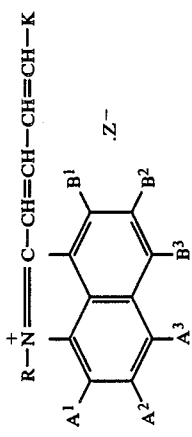

| Example No. | —R | —A$^1$ | —A$^2$ | —A$^3$ | —B$^1$ | —B$^2$ | —B$^3$ | —K | Z$^-$ | λ max (in CHCl$_3$) (nm) |
|---|---|---|---|---|---|---|---|---|---|---|
| 270 | " | " | " | —CH$_3$ | " | " | " | ![K group: 1-naphthyl with 4-NHC$_2$H$_4$OCH$_3$] | " | 855 |
| 271 | " | " | " | —C$_2$H$_5$ | " | " | —C$_2$H$_5$ | ![pyridine with CH$_3$, CN, NHPh, H$_3$COH$_4$C$_2$HN, CH$_3$] | " | 835 |
| 272 | " | —H | " | —H | " | —H | —H | " | " | 820 |
| 273 | " | " | " | —SCN | " | " | " | ![thiophene with N(C$_2$H$_5$)$_2$] | SCN$^-$ | 828 |
| 274 | —C$_3$H$_7$(n) | " | " | —Br | " | " | " | ![tolyl with N(C$_4$H$_9$(n))$_2$] | " | 828 |
| 275 | " | " | " | " | " | " | " | " | " | 825 |
| 276 | —C$_2$H$_5$ | " | " | " | " | " | " | " | PF$_6^-$ | 825 |
| 277 | " | " | " | " | " | " | " | " | SiF$_6^-$ | 825 |
| 278 | " | " | " | " | " | " | " | " | TiF$_6^-$ | 820 |

EXAMPLES 279 TO 365

In the same manner as described in Example 187, naphthostyril dyes shown in Table 4 were synthesized. Each of the resulting naphthostyril dyes was coated on a substrate of grooved PMMA disc in the same manner as in Example 187 to form a coated film. The wavelength of the maximum absorption of the coated film was shown in Table 4.

When a laser beam having a center wavelength of 830 nm was irradiated on the coated film, clear-outlined pits were formed. The coated film had a high reflectance, high sensitivity, and an excellent C/N ratio and exhibited satisfactory light resistance and resistance to reproducing light.

TABLE 4
Naphtholactam Dye
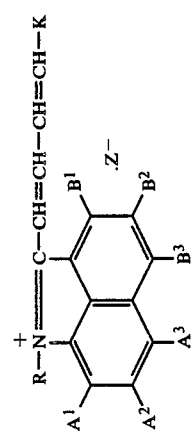
| Example No. | —R | —A¹ | —A² | —A³ | —B¹ | —B² | —B³ | —K | Z⁻ | $\lambda_{max}$ (coating) film (nm) |
|---|---|---|---|---|---|---|---|---|---|---|
| 279 | —C₂H₅ | —H | —H | —Br | —H | —H | —H | p-tolyl-N(C₂H₅)(C₂H₅) | Ni(S₂C₆H₃-CH₃)₂ | 825 |
| 280 | —C₂H₅ | —H | —H | —Br | —H | —H | —H | p-tolyl-N(C₅H₉(n))(C₄H₉(n)) | Ni(S₂C₆H₃-CH₃)₂ | 830 |
| 281 | —C₂H₅ | —H | —H | —Br | —H | —H | —H | p-tolyl-N(C₃H₇(n))(C₃H₇(n)) | Ni(S₂C₆H₃-CH₃)₂ | 827 |
| 282 | —C₂H₅ | —H | —H | —Br | —H | —H | —H | p-tolyl-N(C₂H₅)(C₄H₉(n)) | Ni(S₂C₆H₃-CH₃)₂ | 827 |
| 283 | —C₂H₅ | —H | —H | —Br | —H | —H | —H | p-tolyl-N(C₄H₉(n))(C₂H₄OCH₃) | Ni(S₂C₆H₃-CH₃)₂ | 815 |

TABLE 4-continued
Naphtholactam Dye
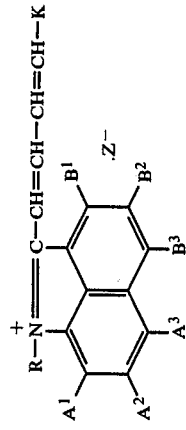
| Example No. | —R | —A¹ | —A² | —A³ | —B¹ | —B² | —B³ | —K | Z⁻ | λmax (coating) film (nm) |
|---|---|---|---|---|---|---|---|---|---|---|
| 284 | —C₂H₅ | —H | —H | —Br | —H | —H | —H | N(C₄H₉(n))(C₂H₄OCOCH₃), p-tolyl | Ni(S₂C₆H₃-CH₃)₂ | 815 |
| 285 | —C₂H₅ | —H | —H | —Br | —H | —H | —H | N(C₄H₉(n))(C₂H₄Cl), p-tolyl | Ni(S₂C₆H₃-CH₃)₂ | 810 |
| 286 | —C₂H₅ | —H | —H | —Br | —H | —H | —H | N(C₄H₉(n))(C₂H₄OCOCH₃), p-tolyl | Ni(S₂C₆H₂Cl₂)₂ | 815 |
| 287 | —C₂H₅ | —H | —H | —Br | —H | —H | —H | N(C₄H₉(n))(C₂H₄COOC₂H₅), p-tolyl | Ni(S₂C₆H₃Cl)₂ | 815 |
| 288 | —C₂H₅ | —H | —H | —Br | —H | —H | —H | N(C₄H₉(n))(C₂H₄CN), p-tolyl | Ni(S₂C₆H₂Cl₂)₂ | 800 |

TABLE 4-continued

Naphtholactam Dye (structure shown: R-N⁺=C-CH=CH-CH=CH-CH=CH-K with naphthalene ring bearing A¹, A², A³, B¹, B², B³ substituents, Z⁻ counterion)

| Example No. | —R | —A¹ | —A² | —A³ | —B¹ | —B² | —B³ | —K | Z⁻ | λmax (coating film) (nm) |
|---|---|---|---|---|---|---|---|---|---|---|
| 289 | —C₂H₅ | —H | —H | —Br | —H | —H | —H | N(C₄H₉(n))(C₂H₄OC₂H₄OCH₃)(p-tolyl) | Ni(S₂C₆H₂(CH₃)₂)₂ | 815 |
| 290 | —C₂H₅ | —H | —H | —Br | —H | —H | —H | N(C₄H₉(n))(C₂H₄OC₆H₅)(p-tolyl) | Ni(S₂C₆H₂(CH₃)₂)₂ | 815 |
| 291 | —C₂H₅ | —H | —H | —Br | —H | —H | —H | N(C₄H₉(n))(C₂H₄C₆H₅)(p-tolyl) | Ni[S₂C₆H₃N(C₂H₅)₂]₂ | 825 |
| 292 | —C₂H₅ | —H | —H | —Br | —H | —H | —H | N(C₄H₉(n))(CH₂C₆H₅)(p-tolyl) | Ni(OSC₆H₄)₂ | 805 |
| 293 | —C₂H₅ | —H | —H | —Br | —H | —H | —H | N(C₄H₉(n))(C₂H₄OH)(p-tolyl) | Ni(S₂C₆H₃CH₃)₂ | 815 |

TABLE 4-continued

Naphtholactam Dye

[Structure: Naphtholactam dye core with R—N⁺=C—CH=CH—CH=CH—K, substituents A¹, A², A³, B¹, B², B³, and counterion Z⁻]

| Example No. | —R | —A¹ | —A² | —A³ | —B¹ | —B² | —B³ | —K | Z⁻ | λ_max (coating) film (nm) |
|---|---|---|---|---|---|---|---|---|---|---|
| 294 | —C₂H₅ | —H | —H | —Br | —H | —H | —H | [N(C₄H₉(n))(C₂H₄O-C₆H₄-NO₂) on p-tolyl] | [Ni(S₂C₆H₃-CH₃)₂] | 815 |
| 295 | —C₂H₅ | —H | —H | —Br | —H | —H | —H | [N(C₄H₉(n))(CH₂-tetrahydrofuranyl) on p-tolyl] | [Ni(S₂C₆H₃-CH₃)₂] | 815 |
| 296 | —C₂H₅ | —H | —H | —Br | —H | —H | —H | [N(C₄H₉(n))(C₂H₄O-C₆H₄-Cl) on p-tolyl] | [Ni(S₂C₆H₃-CH₃)₂] | 820 |
| 297 | —C₂H₅ | —H | —H | —Br | —H | —H | —H | [N(C₂H₅)₂ on m-tolyl] | [Ni(S₂C₆H₃-CH₃)₂] | 835 |

TABLE 4-continued

Naphtholactam Dye

Structure:
R—N⁺=C(—CH=CH—CH=CH—CH—K) on naphthalene ring with positions A¹, A², A³, B¹, B², B³; Z⁻ counterion.

| Example No. | —R | —A¹ | —A² | —A³ | —B¹ | —B² | —B³ | —K | Z⁻ | λmax (coating) film (nm) |
|---|---|---|---|---|---|---|---|---|---|---|
| 298 | —C₂H₅ | —H | —H | —Br | —H | —H | —H | 3-methyl-4-methyl-N(CH₃)(C₂H₅)-phenyl | Ni(S₂C₆H₃-CH₃)₂ complex | 835 |
| 299 | —C₂H₅ | —H | —H | —Br | —H | —H | —H | 3-methyl-4-methyl-N(C₄H₉(n))₂-phenyl | Ni(S₂C₆H₃-CH₃)₂ complex | 840 |
| 300 | —C₂H₅ | —H | —H | —Br | —H | —H | —H | 2-OCH₃-4-NHCOCH₃-N(C₂H₅)₂-phenyl | Ni(S₂C₆H₃-CH₃)₂ complex | 870 |
| 301 | —C₂H₅ | —H | —H | —Br | —H | —H | —H | 2-CH₃-4-OCH₃-N(C₂H₅)₂-phenyl | Ni(S₂C₆H₃-CH₃)₂ complex | 850 |

TABLE 4-continued

Naphtholactam Dye

| Example No. | —R | —A¹ | —A² | —A³ | —B¹ | —B² | —B³ | —K | Z⁻ | λ_max (coating) film (nm) |
|---|---|---|---|---|---|---|---|---|---|---|
| 302 | —C₂H₅ | —H | —H | —Br | —H | —H | —H | N(C₆H₁₃(n))₂ on 3-Cl-4-methylphenyl | Ni(S₂C₂(4-CH₃-C₆H₃)₂)₂ | 800 |
| 303 | —C₂H₅ | —H | —H | —Br | —H | —H | —H | N(C₄H₉(n))₂ on 4-methylphenyl | Ni(S₂C₂(4-CH₃-C₆H₃)₂)₂ | 830 |
| 304 | —C₂H₅ | —H | —H | —Br | —H | —H | —H | N(C₂H₅)(C₂H₄N(C₂H₅)₂) on 4-methylphenyl | Ni(S₂C₂(4-CH₃-C₆H₃)₂)₂ | 820 |
| 305 | —C₂H₅ | —H | —H | —Br | —H | —H | —H | N(C₂H₅)(C₂H₄NH₂) on 4-methylphenyl | Ni(S₂C₂(4-CH₃-C₆H₃)₂)₂ | 820 |
| 306 | —C₂H₅ | —H | —H | —Br | —H | —H | —H | N(C₂H₅)(C₂H₄N⁺(CH₃)₃) I⁻ on 4-methylphenyl | Ni(S₂C₂(4-CH₃-C₆H₃)₂)₂ | 815 |

TABLE 4-continued
Naphtholactam Dye
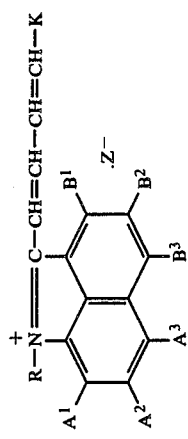
| Example No. | −R | −A¹ | −A² | −A³ | −B¹ | −B² | −B³ | −K | Z− | $\lambda_{max}$ (coating) film (nm) |
|---|---|---|---|---|---|---|---|---|---|---|
| 307 | −C₂H₅ | −H | −H | −Br | −H | −H | −H | N(C₂H₅)(phenyl)(p-tolyl) | Ni(S₂C₆H₃-CH₃)₂ | 830 |
| 308 | −C₂H₅ | −H | −H | −Br | −H | −H | −H | N(C₂H₅)(4-OCH₃-phenyl)(p-tolyl) | Ni(S₂C₆H₃-CH₃)₂ | 830 |
| 309 | −C₂H₅ | −H | −H | −Br | −H | −H | −H | N(C₂H₅)(biphenyl-2,2'-diyl with 5-CH₃) | Ni(S₂C₆H₃-CH₃)₂ | 845 |
| 310 | −C₂H₅ | −H | −H | −Br | −H | −H | −H | N(C₄H₉(n))(cyclohexyl)(p-tolyl) | Ni(S₂C₆H₃-CH₃)₂ | 835 |

TABLE 4-continued

Naphtholactam Dye $$\text{R-N}^+\text{=C-CH=CH-CH=CH-K} \quad Z^-$$

(with A¹, A², A³ on one ring and B¹, B², B³ on the other)

| Example No. | —R | —A¹ | —A² | —A³ | —B¹ | —B² | —B³ | —K | Z⁻ | λ_max (coating) film (nm) |
|---|---|---|---|---|---|---|---|---|---|---|
| 311 | —C₂H₅ | —H | —H | —Br | —H | —H | —H | 4-(N(C₈H₁₇(n))₂)-methylphenyl | Ni(S₂C₆H₃-CH₃)₂ (bis(4-methylbenzenedithiolato)Ni) | 835 |
| 312 | —C₂H₅ | —H | —H | —Br | —H | —H | —H | 4-(N(C₃H₇(i))(C₂H₅))-methylphenyl | Ni(S₂C₆H₃-CH₃)₂ | 826 |
| 313 | —C₂H₅ | —H | —H | —Br | —H | —H | —H | 4-(N(C₂H₅)₂)-methyl-NHCOOCH₃-phenyl | Ni(S₂C₆H₃-CH₃)₂ | 855 |
| 314 | —C₂H₅ | —H | —H | —Br | —H | —H | —H | 4-(N(C₂H₅)₂)-methyl-NHSO₂CH₃-phenyl | Ni(S₂C₆H₄)₂ | 845 |
| 315 | —C₃H₇(n) | —H | —H | —Br | —H | —H | —H | 4-(N(C₂H₅)₂)-methylphenyl | Ni(S₂C₆H₄)₂ | 825 |

TABLE 4-continued

Naphtholactam Dye $$R-N^+=C-CH=CH-CH=CH-K \quad Z^-$$

(with A¹, A², A³, B¹, B², B³ substituents on the naphthalene ring)

| Example No. | —R | —A¹ | —A² | —A³ | —B¹ | —B² | —B³ | —K | Z⁻ | λmax (coating film) (nm) |
|---|---|---|---|---|---|---|---|---|---|---|
| 316 | —C₅H₁₁(n) | —H | —H | —Br | —H | —H | —H | p-tolyl-N(C₂H₅)₂ | Ni(S-benzene)₄ | 825 |
| 317 | —CH₂—C₆H₅ | —H | —H | —Br | —H | —H | —H | p-tolyl-N(C₂H₅)₂ | Ni(S-benzene)₄ | 825 |
| 318 | —C₆H₅ | —H | —H | —Br | —H | —H | —H | p-tolyl-N(C₂H₅)₂ | Ni(S-benzene)₄ | 825 |
| 318 | —C₂H₄OCH₃ | —H | —H | —Br | —H | —H | —H | p-tolyl-N(C₂H₅)₂ | Ni(S-benzene)₄ | 825 |
| 320 | —CH₂CH₂CH₂OCH₃ | —H | —H | —Br | —H | —H | —H | p-tolyl-N(C₂H₅)₂ | Ni(S-benzene)₄ | 825 |
| 321 | —C₃H₇—C₆H₅ | —H | —H | —Br | —H | —H | —H | p-tolyl-N(C₂H₅)₂ | Ni(S,O-benzene)₂ | 820 |

TABLE 4-continued

Naphtholactam Dye $$\text{structure: } R-N^+=C-CH=CH-CH=CH-K \text{ on naphthalene with substituents } A^1, A^2, A^3, B^1, B^2, B^3, \text{ and counterion } Z^-$$

| Example No. | —R | —A$^1$ | —A$^2$ | —A$^3$ | —B$^1$ | —B$^2$ | —B$^3$ | —K | Z$^-$ | $\lambda_{max}$ (coating) film (nm) |
|---|---|---|---|---|---|---|---|---|---|---|
| 322 | —C$_2$H$_4$O—C$_6$H$_5$ | —H | —H | —Br | —H | —H | —H | p-tolyl-N(C$_2$H$_5$)$_2$ | Ni(benzo[dithiolate/catecholate]) complex | 820 |
| 323 | —C$_2$H$_4$OC$_2$H$_4$OCH$_3$ | —H | —H | —Br | —H | —H | —H | p-tolyl-N(C$_2$H$_5$)$_2$ | Ni complex | 820 |
| 324 | —C$_2$H$_4$OC$_2$H$_4$OC$_2$H$_4$OCH$_3$ | —H | —H | —Br | —H | —H | —H | p-tolyl-N(C$_2$H$_5$)$_2$ | Ni complex | 825 |
| 325 | —C$_2$H$_4$OCH$_2$CH=CH$_2$ | —H | —H | —Br | —H | —H | —H | p-tolyl-N(C$_2$H$_5$)$_2$ | Ni complex | 825 |
| 326 | —CH$_2$CH=CH$_2$ | —H | —H | —Br | —H | —H | —H | p-tolyl-N(C$_2$H$_5$)$_2$ | Ni complex | 820 |

TABLE 4-continued

Naphtholactam Dye

| Example No. | —R | —A¹ | —A² | —A³ | —B¹ | —B² | —B³ | —K | Z⁻ | $\lambda_{max}$ (coating) film (nm) |
|---|---|---|---|---|---|---|---|---|---|---|
| 327 | cyclohexyl | —H | —H | —Br | —H | —H | —H | p-tolyl-N(C₂H₅)₂ | Ni(S,O-benzene) complex | 825 |
| 328 | —C₂H₄OCH₂CH=CH₂ | —H | —H | —Br | —H | —H | —H | p-tolyl-N(C₂H₅)₂ | Ni(dithiolene-tolyl)₂ | 825 |
| 329 | —C₂H₄OH | —H | —H | —Br | —H | —H | —H | p-tolyl-N(C₂H₅)₂ | Ni(dithiolene-tolyl)₂ | 825 |
| 330 | —C₂H₄Cl | —H | —H | —Br | —H | —H | —H | p-tolyl-N(C₂H₅)₂ | Ni(dithiolene-tolyl)₂ | 830 |
| 331 | —CH₂-(tetrahydrofuran-2-yl) | —H | —H | —Br | —H | —H | —H | p-tolyl-N(C₂H₅)₂ | Ni(dithiolene-tolyl)₂ | 825 |
| 332 | —C₂H₄CN | —H | —H | —Br | —H | —H | —H | p-tolyl-N(C₂H₅)₂ | Ni(dithiolene-tolyl)₂ | 830 |

TABLE 4-continued

Naphtholactam Dye $$\text{structure with } R-\overset{+}{N}=C-CH=CH-CH=CH-K, \text{ with } A^1, A^2, A^3, B^1, B^2, B^3 \text{ substituents, } Z^-$$

| Example No. | —R | —A$^1$ | —A$^2$ | —A$^3$ | —B$^1$ | —B$^2$ | —B$^3$ | —K | Z$^-$ | $\lambda_{max}$ (coating) film (nm) |
|---|---|---|---|---|---|---|---|---|---|---|
| 333 | —C$_2$H$_4$CN | —H | —H | —H | —H | —H | —H | 4-(N(C$_2$H$_5$)$_2$)-C$_6$H$_4$-CH$_3$ | Ni(dithiolene-4-CH$_3$-C$_6$H$_3$)$_2$ | 820 |
| 334 | —C$_2$H$_4$CN | —H | —H | —N(CH$_3$)$_2$ | —H | —H | —H | 4-(N(C$_2$H$_5$)$_2$)-C$_6$H$_4$-CH$_3$ | Ni(dithiolene-4-CH$_3$-C$_6$H$_3$)$_2$ | 835 |
| 335 | —C$_2$H$_4$CN | —H | —H | —H | —H | —H | —H | 4-(N(C$_4$H$_9$(n))$_2$)-C$_6$H$_4$-CH$_3$ | Ni(dithiolene-4-CH$_3$-C$_6$H$_3$)$_2$ | 830 |
| 336 | —C$_2$H$_4$CN | —H | —H | —H | —H | —H | —H | 4-(N(C$_5$H$_{11}$(n))$_2$)-C$_6$H$_4$-CH$_3$ | Ni(dithiolene-4-CH$_3$-C$_6$H$_3$)$_2$ | 830 |
| 337 | —C$_2$H$_5$ | —H | —H | —N(CH$_3$)$_2$ | —H | —H | —H | 4-(N(C$_2$H$_5$)$_2$)-C$_6$H$_4$-CH$_3$ | Ni(dithiolene-4-CH$_3$-C$_6$H$_3$)$_2$ | 835 |

TABLE 4-continued

Naphtholactam Dye

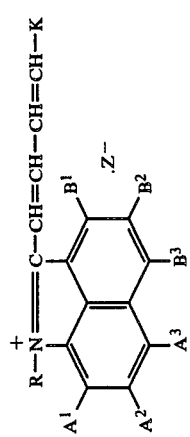

| Example No. | —R | —A$^1$ | —A$^2$ | —A$^3$ | —B$^1$ | —B$^2$ | —B$^3$ | —K | Z$^-$ | $\lambda_{max}$ (coating) film (nm) |
|---|---|---|---|---|---|---|---|---|---|---|
| 338 | —C$_2$H$_5$ | —H | —H | —Cl | —H | —H | —H | p-tolyl-N(C$_2$H$_5$)$_2$ | Ni(S$_2$C$_6$H$_3$CH$_3$)$_2$ | 815 |
| 339 | —C$_2$H$_5$ | —Br | —H | —Br | —H | —H | —H | p-tolyl-N(C$_2$H$_5$)$_2$ | Ni(S$_2$C$_6$H$_3$CH$_3$)$_2$ | 825 |
| 340 | —C$_2$H$_5$ | —H | —H | —OCH$_3$ | —H | —H | —H | p-tolyl-N(C$_2$H$_5$)$_2$ | Ni(S$_2$C$_6$H$_3$CH$_3$)$_2$ | 835 |
| 341 | —C$_2$H$_5$ | —H | —H | —NHCH$_3$ | —H | —H | —H | p-tolyl-N(C$_2$H$_5$)$_2$ | Ni(S$_2$C$_6$H$_3$CH$_3$)$_2$ | 835 |
| 342 | —C$_2$H$_5$ | —H | —H | —Br | —H | —H | —H | (substituted aryl amine) | Ni(S$_2$C$_6$H$_3$Cl)$_2$ | 860 |

TABLE 4-continued

Naphtholactam Dye

[Structure: Naphtholactam core with R—N⁺, C=CH—CH=CH—CH=CH—K, Z⁻, substituents A¹, A², A³, B¹, B², B³]

| Example No. | —R | —A¹ | —A² | —A³ | —B¹ | —B² | —B³ | —K | Z⁻ | λmax (coating) film (nm) |
|---|---|---|---|---|---|---|---|---|---|---|
| 343 | —C₂H₅ | —H | —H | —Br | —H | —H | —H | [4-methyl-2-(2-methylpent-4-yl with N(CH₃)(C₂H₅)) phenyl group] | Ni(S₂C₆H₃Cl)₂ complex | 875 |
| 344 | —C₂H₅ | —H | —H | —Br | —H | —H | —H | [4-methyl-2-(morpholino-N-C₂H₄OCH₂CH=CH₂) phenyl group] | Ni(S₂C₆H₃Cl)₂ complex | 855 |
| 345 | —C₂H₅ | —H | —H | —Br | —H | —H | —H | [5-methyl-8-(NHC₄H₉(n))quinolinyl group] | Ni(S₂C₆H₃Cl)₂ complex | 875 |

TABLE 4-continued

Naphtholactam Dye $$\begin{array}{c}\text{R}-\overset{+}{\text{N}}=\text{C}-\text{CH}=\text{CH}-\text{CH}=\text{CH}-\text{K} \\ \text{with A}^1, \text{A}^2, \text{A}^3, \text{B}^1, \text{B}^2, \text{B}^3 \text{ substituents, Z}^-\end{array}$$

| Example No. | —R | —A¹ | —A² | —A³ | —B¹ | —B² | —B³ | —K | Z⁻ | λ_max (coating) film (nm) |
|---|---|---|---|---|---|---|---|---|---|---|
| 346 | —C₂H₅ | —H | —H | —Br | —H | —H | —H | 1-(n-butylamino)naphthalenyl | Ni(S₂C₆H₃Cl)₂ | 875 |
| 347 | —C₂H₅ | —H | —H | —Br | —H | —H | —H | pyridine with CH₃, CN, NHCH₂H₅, NHC₄H₉(n) | Ni(S₂C₆H₃Cl)₂ | 865 |
| 348 | —C₂H₅ | —H | —H | —Br | —H | —H | —H | N-(C₄H₉(n))-N-(CH₂CH=CH₂)-p-tolyl | Ni(S₂C₆H₃Cl)₂ | 820 |
| 349 | —C₂H₅ | —H | —H | —Br | —H | —H | —H | 2-(CH(CH₃)CH₂C(CH₃)₃)-4-CH₃-phenyl-N(C₂H₄OCH₃) | Ni(S₂C₆H₃CH₃)₂ | 855 |

TABLE 4-continued
Naphtholactam Dye
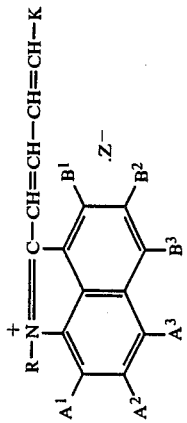
| Example No. | —R | —A¹ | —A² | —A³ | —B¹ | —B² | —B³ | —K | Z⁻ | $\lambda_{max}$ (coating) film (nm) |
|---|---|---|---|---|---|---|---|---|---|---|
| 350 | —C₂H₅ | —H | —H | —Br | —H | —H | —H | 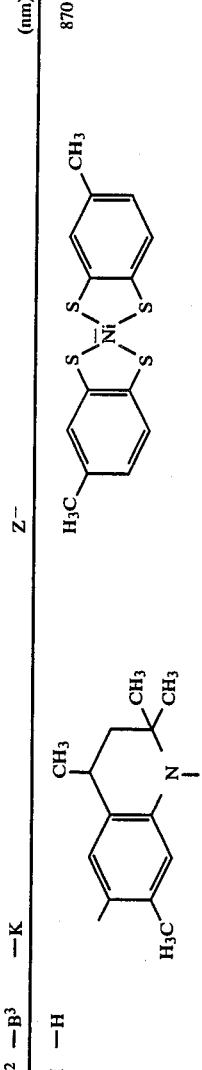 | 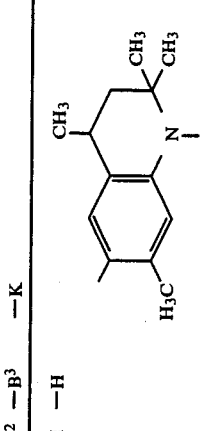 | 870 |
| 351 | —C₂H₅ | —H | —H | —OH | —H | —H | —H | 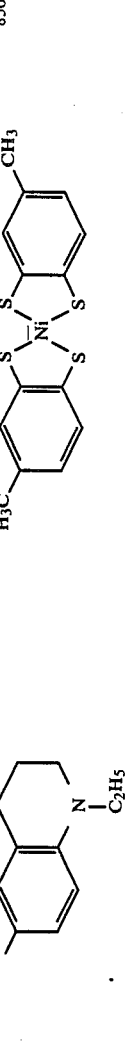 | 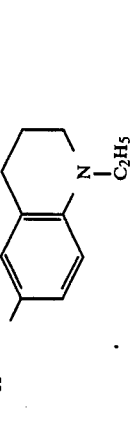 | 850 |
| 352 | —C₂H₅ | —H | —H | —NH₂ | —H | —H | —H | 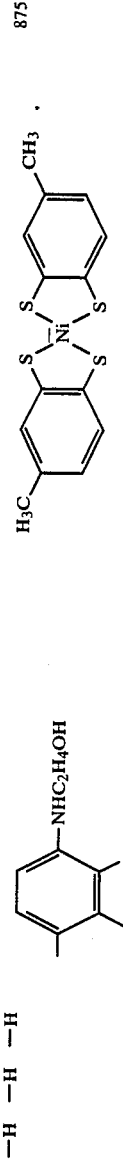 |  | 875 |

TABLE 4-continued

Naphtholactam Dye $$R-\overset{+}{N}=C-CH=CH-CH=CH-CH=CH-K \cdot Z^-$$

with positions $A^1, A^2, A^3, B^1, B^2, B^3$ on the naphthalene ring.

| Example No. | —R | —$A^1$ | —$A^2$ | —$A^3$ | —$B^1$ | —$B^2$ | —$B^3$ | —K | $Z^-$ | $\lambda_{max}$ (coating) film (nm) |
|---|---|---|---|---|---|---|---|---|---|---|
| 353 | —$C_2H_5$ | —H | —H | —$NHC_2H_5$ | —H | —H | —H | 1-naphthyl with NHC$_2$H$_4$OC$_2$H$_4$OH substituent | Ni(S-tolyl-S)$_2$ complex (4,4'-dimethyl) | 875 |
| 354 | —$C_2H_5$ | —H | —H | —NHCOCH$_3$ | —H | —H | —H | pyridine with CH$_3$, CN, NHC$_3$H$_6$OCH$_3$, H$_3$COH$_6$C$_3$HN substituents | Ni(S-tolyl-S)$_2$ complex | 855 |
| 355 | —$C_2H_5$ | —H | —H | —N(COCH$_3$)$_2$ | —H | —H | —H | thiourea derivative with N(C$_2$H$_5$)$_2$ and =S | Ni(S-tolyl-S)$_2$ complex | 825 |
| 356 | —$C_2H_5$ | —H | —H | —Br | —H | —H | —H | 4-methylphenyl-N(CH$_3$)(C$_2$H$_4$OCOCH$_3$) with CH(CH$_3$)C(CH$_3$)$_2$ group | Ni(S-tolyl-S)$_2$ complex | 838 |

TABLE 4-continued

Naphtholactam Dye

| Example No. | —R | —A¹ | —A² | —A³ | —B¹ | —B² | —B³ | —K | Z⁻ | λmax (coating) film (nm) |
|---|---|---|---|---|---|---|---|---|---|---|
| 357 | —C₂H₅ | —Br | —H | —Br | —H | —H | —H | (2-(1,1,3-trimethyl)-4-methyl-N-(2-hydroxyethyl)-N-methylaniline group) | Ni(S₂C₆H₃-CH₃)₂ complex | 875 |
| 358 | —C₂H₅ | —Br | —H | —Br | —Br | —H | —H | (6-methyl-1-(2-hydroxyethyl)-1,2,3,4-tetrahydroquinoline group) | Ni(S₂C₆H₃-CH₃)₂ complex | 845 |
| 359 | —C₂H₅ | —Br | —H | —Br | —Br | —H | —Br | (8-(2-methoxyethylamino)-5-methylquinoline group) | Ni(S₂C₆H₃-CH₃)₂ complex | 860 |

TABLE 4-continued
Naphtholactam Dye
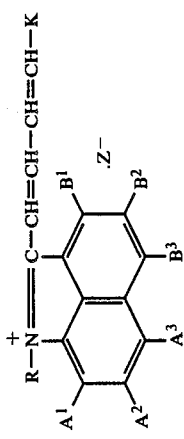
| Example No. | —R | —A¹ | —A² | —A³ | —B¹ | —B² | —B³ | —K | Z⁻ | $\lambda_{max}$ (coating) film (nm) |
|---|---|---|---|---|---|---|---|---|---|---|
| 360 | —C₂H₅ | —Br | —H | —CH₃ | —Br | —H | —Br | | Ni(bis-tolyl-dithiolene) | 860 |
| 361 | —C₂H₅ | —Br | —H | —C₂H₅ | —Br | —H | —C₂H₅ | ![K2](pyridine with CH₃, CN, NHPh, NHC₂H₄OCH₃) | Ni(bis-tolyl-dithiolene) | 840 |
| 362 | —C₂H₅ | —H | —H | —H | —H | —H | —H | ₂, 5-CH₃) | Ni(bis-tolyl-dithiolene) | 830 |
| 363 | —C₂H₅ | —H | —H | —SCN | —H | —H | —H | )₂, 3-CH₃) | Ni(bis-tolyl-dithiolene) | 835 |

TABLE 4-continued
Naphtholactam Dye
| Example No. | —R | —A¹ | —A² | —A³ | —B¹ | —B² | —B³ | —K | Z⁻ | $\lambda_{max}$ (coating) film (nm) |
|---|---|---|---|---|---|---|---|---|---|---|
| 364 | —C₃H₇(n) | —H | —H | —SCN | —H | —H | —H | 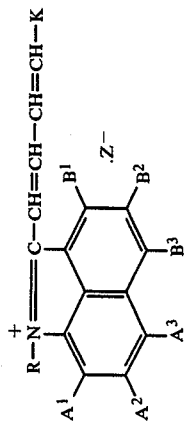 | 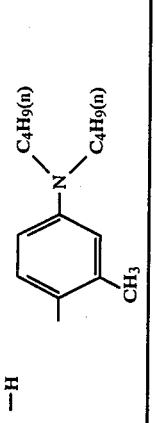 | 835 |
| 365 | —C₄H₉(n) | —H | —H | —SCN | —H | —H | —H | (same as above) | (same as above) | 835 |

While the invention has been described in detail and with reference to specific embodiments thereof, it will be apparent to one skilled in the art that various changes and modifications can be made therein without departing from the spirit and scope thereof.

What is claimed is:

1. An optical recording medium adapted to record information by irradiating said recording medium comprising a support having provided thereon a recording layer containing a dye, with a focused laser beam, said dye undergoing thermal changes to thereby make a partial difference in reflectance on the recording medium, and for reproducing the recorded information by reading the difference in reflectance, which comprises a naphthostyril dye represented by formula (I):

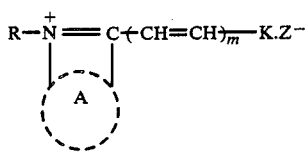

wherein K represents a substituted or unsubstituted aromatic amine residue; R represents a substituted or unsubstituted alkyl group, a substituted or unsubstituted cycloalkyl group, a substituted or unsubstituted aryl group, or a substituted or unsubstituted allyl group; $Z^-$ represents an anion; ring A represents a substituted or unsubstituted naphthalene ring; and m represents 1 or 2.

2. An optical recording medium as in claim 1, wherein said naphthostyril dye is a compound represented by formula (II):

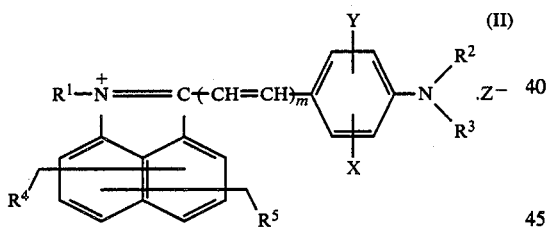

wherein X and Y each represents a hydrogen atom, a halogen atom, an alkyl group, an acylamino group, or an alkoxy group; $R^1$ represents a substituted or unsubstituted alkyl group, a substituted or unsubstituted cycloalkyl group, a substituted or unsubstituted aryl group, or a substituted or unsubstituted allyl group; $R^2$ and $R^3$ each represents a hydrogen atom, a substituted or unsubstituted alkyl group having up to 20 carbon atoms, a substituted or unsubstituted aryl group, a substituted or unsubstituted allyl group, or a substituted or unsubstituted cycloalkyl group; $R^4$ and $R^5$ each represents a hydrogen atom, a halogen atom, a cyano group, a thiocyanate group, an alkyl group having up to 10 carbon atoms, an alkoxy group having up to 10 carbon atoms, an alkylamino group, an acylamino group, an amino group, or a hydroxyl group; $Z^-$ represents an anion; and m represents 1 or 2.

3. An optical recording medium as in claim 1, wherein said naphthostyril dye is a compound represented by formula (III):

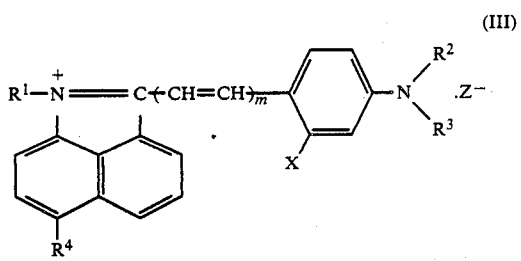

wherein X represents a hydrogen atom or a methyl group; $R^1$ represents an alkyl group having up to 8 carbon atoms, an alkoxyalkyl group, an allyloxyalkyl group, an allyl group, or a hydroxyalkyl group; $R^2$ and $R^3$ each represents an alkyl group having up to 8 carbon atoms, an alkoxyalkyl group, an alkoxyalkoxyalkyl group, an allyloxyalkyl group, an allyl group, a hydroxyalkyl group, or a halogenoalkyl group; $R^4$ represents a hydrogen atom, a halogen atom, or a thiocyanate group; $Z^-$ represents an anion; and m represents 1 or 2.

4. An optical recording medium as in claim 1, wherein the anion as represented by $Z^-$ is $I^-$, $Br^-$, $Cl^-$, $ClO_4^-$, $BF_4^-$, $SCN^-$, $PF_6^-$, $SiF_6^-$, $TiF_6^-$,

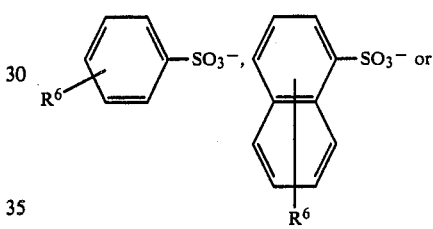

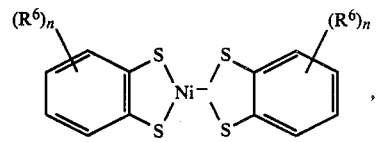

wherein $R^6$, which may be the same or different when multiple $R^6$s are substituted, represents a hydrogen atom, an alkyl group having up to 6 carbon atoms, a halogen atoms, or a dialkyl amino group; and n represents 0 or an integer of from 1 to 3.

5. An optical recording medium as in claim 2, wherein the anion as represented by $Z^-$ is $I^-$, $Br^-$, $Cl^-$, $ClO_4^-$, $BF_4^-$, $SCN^-$, $PF_6^-$, $SiF_6^-$, $TiF_6^-$,

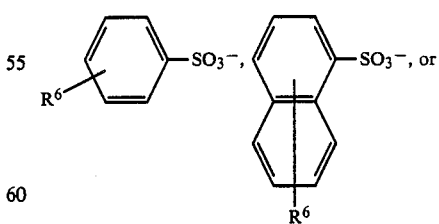

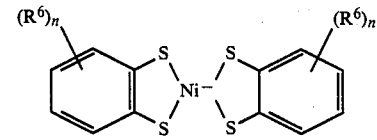

wherein R⁶, which may be the same or different when multiple R⁶s are substituted, represents a hydrogen atom, an alkyl group having up to 6 carbon atoms, a halogen atom, or a dialkylamino group; and n represents 0 ro an integer of from 1 to 3.

6. An optical recording medium as in claim 3, wherein the anion as represented by Z⁻ is I⁻, Br⁻, Cl⁻, ClO₄⁻, BF₄⁻, SCN⁻, PF₆⁻, SiF₆⁻, TiF₆⁻,

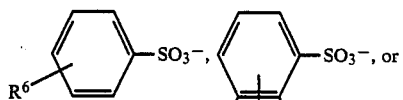

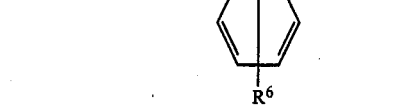

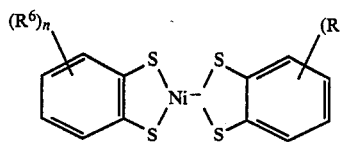

when R⁶, which may be the same or different when multiple R⁶s are substituted, represents a hydrogen atom, an alkyl group having up to 6 carbon atoms, a halogen atom, or a dialkylamino group; and n represents 0 or an integer of from 1 to 3.

7. An optical recording medium as in claim 3, wherein R¹ is an alkyl group having up to 5 carbon atoms, an alkyl group having up to 5 carbon atoms which is substituted with an alkoxy group having up to 4 carbon atoms, an allyloxy group, or a hydroxyl group, or an allyl group.

8. An optical recording medium as in claim 3, wherein R² and R³ each is an alkyl group having up to 8 carbon atoms, an alkyl group having up to 8 carbon atoms which is substituted with an alkoxy group having up to 4 carbon atoms, an alkoxyalkoxy group having up to 4 carbon atoms, an allyloxy group, a hydroxyl group, or a halogen atom, or an allyl group.

9. An optical recording medium as in claim 3, wherein R⁴ is a hydrogen atom, a chlorine atom, a bromine atom, or a thiocyanato group.

10. An optical recording medium as in claim 1, wherein Z⁻ is I⁻, Br⁻, Cl⁻, ClO₄⁻, BF₄⁻, SCN⁻, PF₆⁻, SiF₆⁻ or TiF₆⁻.

11. An optical recording medium as in claim 2, wherein Z⁻ is I⁻, Br⁻, Cl⁻, ClO₄⁻, BF₄⁻, SCN⁻, PF₆⁻, SiF₆⁻ or TiF₆⁻.

12. An optical recording medium as in claim 3, wherein Z⁻ is I⁻, Br⁻, Cl⁻, ClO₄⁻, SCN⁻, PF₆⁻, SiF₆⁻ or TiF₆⁻.

13. An optical recording medium as in claim 1, wherein Z⁻ is

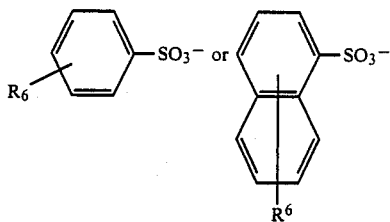

wherein R⁶ is a hydrogen atom, or an alkyl group having up to 4 carbon atoms.

14. An optical recording medium as in claim 2, wherein Z⁻ is

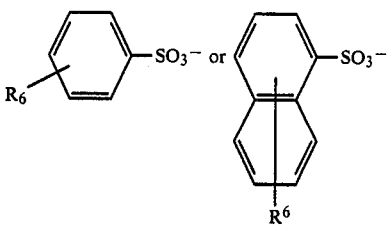

wherein R⁶ is a hydrogen atom, or an alkyl group having up to 4 carbon atoms.

15. An optical recording medium as in claim 3, wherein Z⁻ is

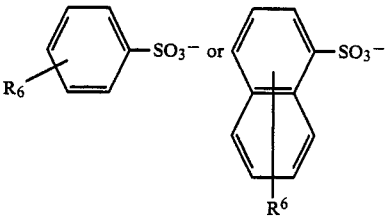

wherein R⁶ is a hydrogen atom, or an alkyl group having up to 4 carbon atoms.

16. An optical recording medium as in claim 1, wherein Z⁻ is

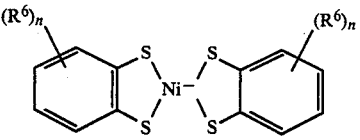

wherein R⁶, which may be the same or different when multiple R⁶s are substituted, represents a hydrogen atom, an alkyl group having up to 4 carbon atoms, a chlorine atom, or a dialkyl group having up to 4 carbon atoms; and n represents 0 or an integer of from 1 to 3.

17. An optical recording medium as in claim 2, wherein Z⁻ is

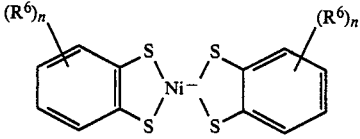

wherein R⁶, which may be the same or different when multiple R⁶s are substituted, represents a hydrogen atom, an alkyl group having up to 4 carbon atoms, a chlorine atom, or a dialkyl group having up to 4 carbon atoms; and n represents 0 or an integer of from 1 to 3.

18. An optical recording media as in claim 3, wherein Z⁻ is

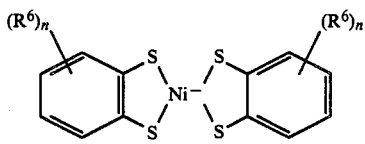

wherein R⁶, which may be the same or different when multiple R⁶s are substituted, represents a hydrogen atom, an alkyl group having up to 4 carbon atoms, a chlorine atom, or a dialkyl group having up to 4 carbon atoms; and n represents 0 or an integer of from 1 to 3.

19. An optical recording medium as in claim 16, wherein Z⁻ is

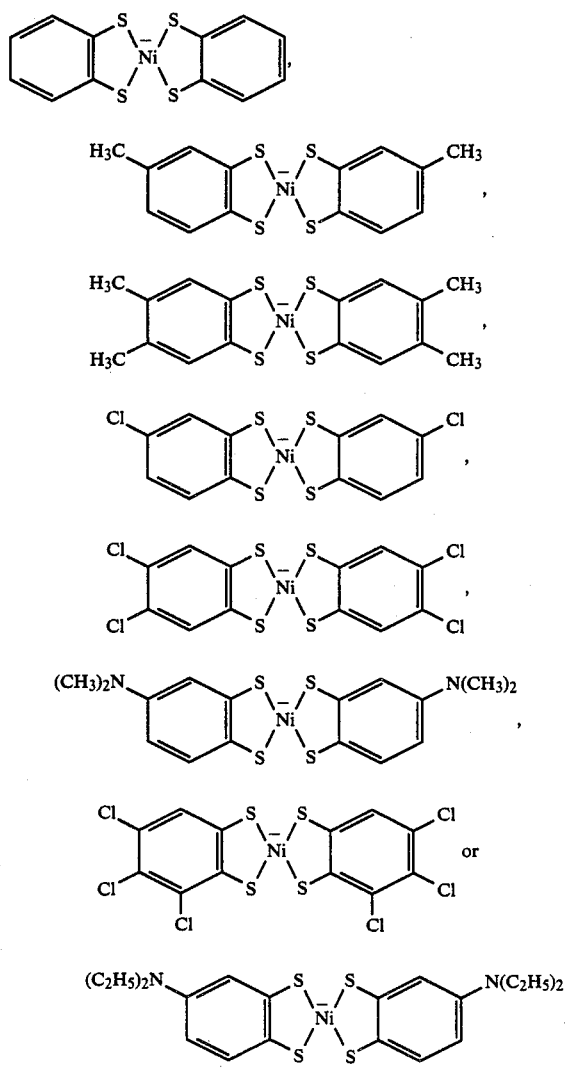

20. An optical recording medium as in claim 17, wherein Z⁻ is

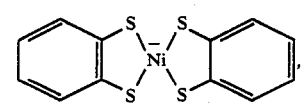

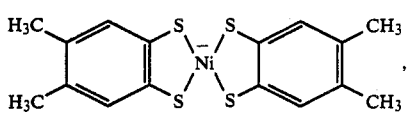

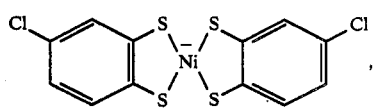

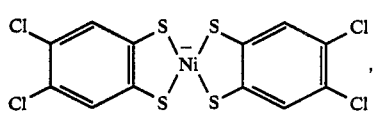

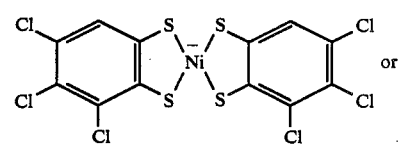

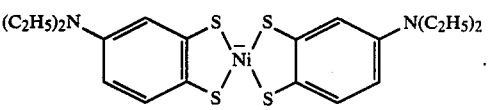 or

21. An optical recording medium as in claim 18, wherein Z⁻ is

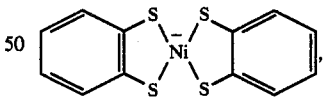

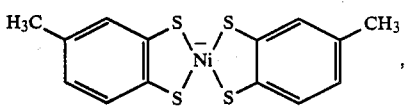

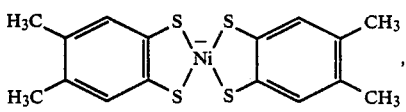

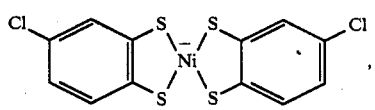

181
-continued
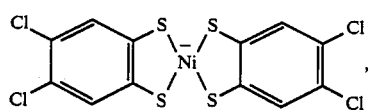
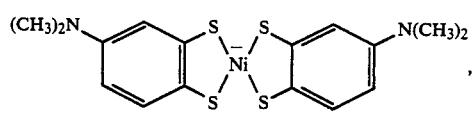
182
-continued
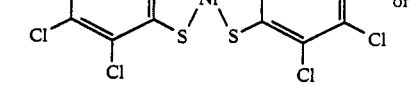   or
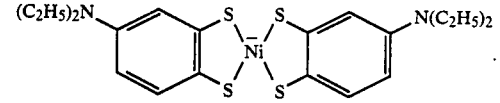
* * * * *